United States Patent
Jaeger

(10) Patent No.: US 12,421,146 B2
(45) Date of Patent: Sep. 23, 2025

(54) AERATION SYSTEM WITH FLEXIBLE HOSE COUPLINGS

(71) Applicant: Claudius Jaeger, Boulder, CO (US)

(72) Inventor: Claudius Jaeger, Boulder, CO (US)

(73) Assignee: ARTEMIS RUBBER TECHNOLOGY INC., Longmont, CO (US)

( * ) Notice: Subject to any disclaimer, the term of this patent is extended or adjusted under 35 U.S.C. 154(b) by 326 days.

(21) Appl. No.: 17/861,121

(22) Filed: Jul. 8, 2022

(65) Prior Publication Data

US 2024/0010532 A1 Jan. 11, 2024

(51) Int. Cl.
*B01F 23/23* (2022.01)
*B01F 23/231* (2022.01)
(Continued)

(52) U.S. Cl.
CPC ...... *C02F 3/201* (2013.01); *B01F 23/231143* (2022.01); *B01F 23/231262* (2022.01);
(Continued)

(58) Field of Classification Search
CPC .... C02F 3/201; C02F 3/14; C02F 3/18; C02F 3/20; C02F 3/22; C02F 2203/006; B01F 23/231143; B01F 23/231262; B01F 23/237611; B01F 2101/305; B01F 23/23113; B01F 23/231142;
(Continued)

(56) References Cited

U.S. PATENT DOCUMENTS 3,325,234 A * 6/1967 Lewin .................. E05B 65/462
312/219
4,966,397 A 10/1990 Mckinnon
(Continued)

FOREIGN PATENT DOCUMENTS

CN 111704238 A * 9/2020 ................ C02F 3/12
JP 2009296739 A * 12/2009 ......... B60R 16/0222

OTHER PUBLICATIONS

English translation of publication CN-111704238-A, published Sep. 25, 2020. (Year: 2020).*
(Continued)

*Primary Examiner* — Joseph W Drodge
(74) *Attorney, Agent, or Firm* — Johnson, Marcou, Isaacs & Nix, LLC; Jennifer Stachniak, Esq.

(57) ABSTRACT

Embodiments disclosed herein provide systems and methods for water aeration in a tank or other body of water that a specialized coupling assembly and flexible hose connectors rather than the commonly used rigid connector elements. The coupling assembly and flexible hose connectors utilized in the aeration grid system provide a more cost effective and flexible system that allows almost limitless configurations of the diffuser elements, depending on the intended application. Further, the coupling assembly and flexible hose connectors enable use with a wide variety of air supply pipe diameters without the necessity of providing a fitting or adapter for each pipe opening. The capability of the aeration system to be readily adapted to different sizes of treatment tanks or ponds, for example, allows the installation and use of a more flexible, prefabricated, or modular, and ultimately more efficient aeration system.

37 Claims, 38 Drawing Sheets

(51) Int. Cl.
*B01F 23/237* (2022.01)
*C02F 3/20* (2023.01)
*F16L 33/20* (2006.01)
*F16L 41/08* (2006.01)
*B01F 101/00* (2022.01)

(52) U.S. Cl.
CPC ....... *B01F 23/237611* (2022.01); *F16L 33/20* (2013.01); *F16L 41/08* (2013.01); *B01F 2101/305* (2022.01)

(58) Field of Classification Search
CPC ...... B01F 23/231241; B01F 23/231264; B01F 23/231265; B01F 23/23; B01F 23/23114; B01F 23/23761; B01F 23/237612; B01F 2101/30; F16L 33/20; F16L 41/08; F16L 33/22; F16L 33/02; F16L 33/035; F16L 41/18; Y02W 10/10
USPC ......... 210/220, 221.2; 261/76, 77, 120, 121, 261/124
See application file for complete search history.

(56) References Cited

U.S. PATENT DOCUMENTS

| | | | |
|---|---|---|---|
| 5,133,876 A * | 7/1992 | Tharp | B01F 35/71805 |
| | | | 261/DIG. 70 |
| 5,326,475 A * | 7/1994 | Kent | C02F 3/101 |
| | | | 210/615 |
| 5,676,823 A | 10/1997 | Mckay et al. | |
| 6,478,964 B1 * | 11/2002 | Redmon | C02F 7/00 |
| | | | 210/220 |
| 11,987,514 B1 * | 5/2024 | Falcone | C02F 7/00 |
| 2002/0140116 A1 | 10/2002 | Tharp | |
| 2003/0192817 A1 | 10/2003 | Frankel et al. | |
| 2003/0226412 A1 | 12/2003 | Rumminger et al. | |
| 2017/0158533 A1 | 6/2017 | Kwan et al. | |
| 2022/0041481 A1 * | 2/2022 | Vimont | C02F 3/20 |

OTHER PUBLICATIONS

English translation of publication JP 2009296739, Dec. 17, 2009. (Year: 2009).*

"International Search Report and Written Opinion issued in Patent Application No. PCT/US2023/027103 filed Jul. 7, 2023", 24.

"Sharkbite Brass Crimp Dual Shut-off Valve", https://web.archive.org/web/20211201155523/https://www.sharkbite.com/us/en/crimp/brass/valves/supply-stops/brass-crimp-dual-shut-off-valve>; p. 1, Dec. 1, 2021.

* cited by examiner

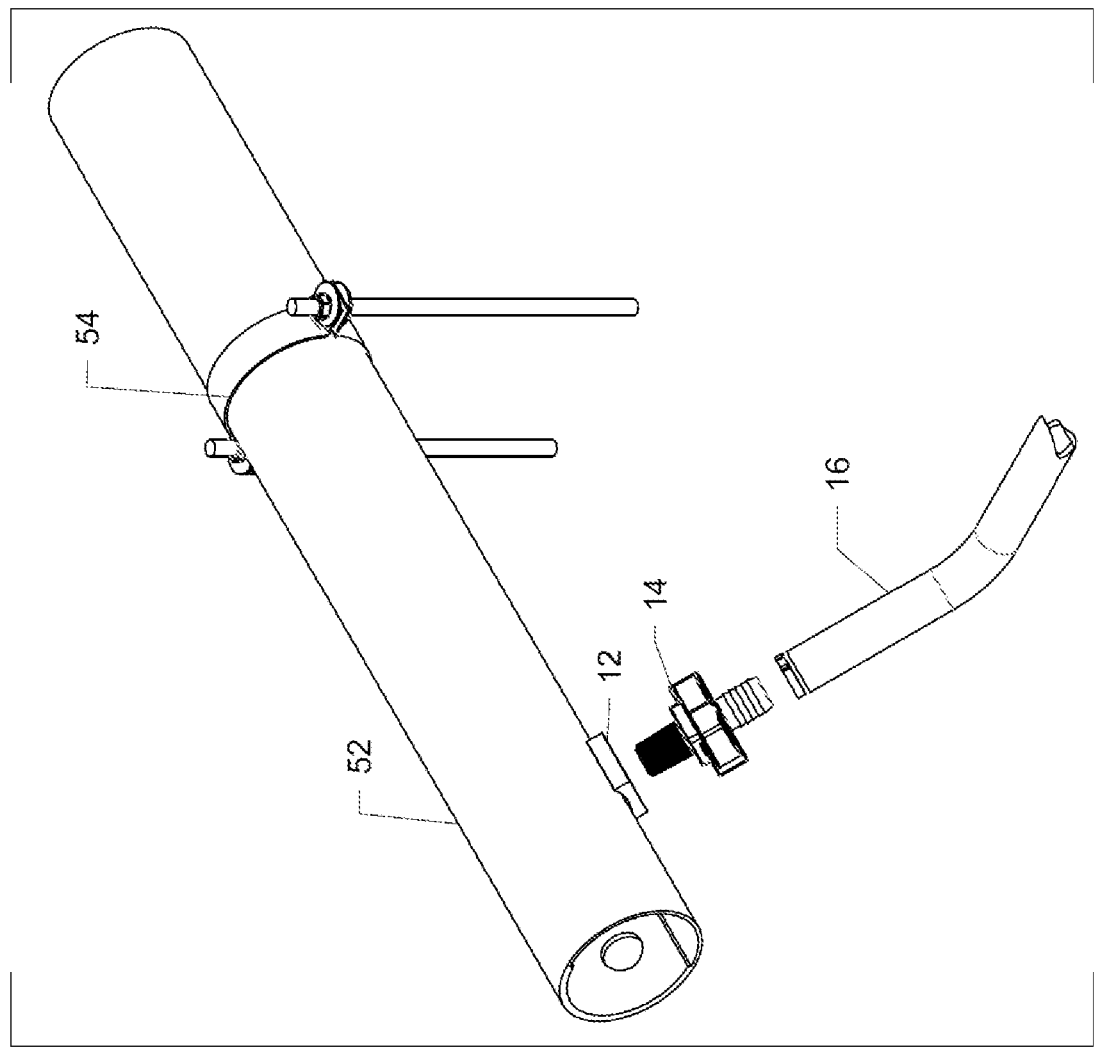

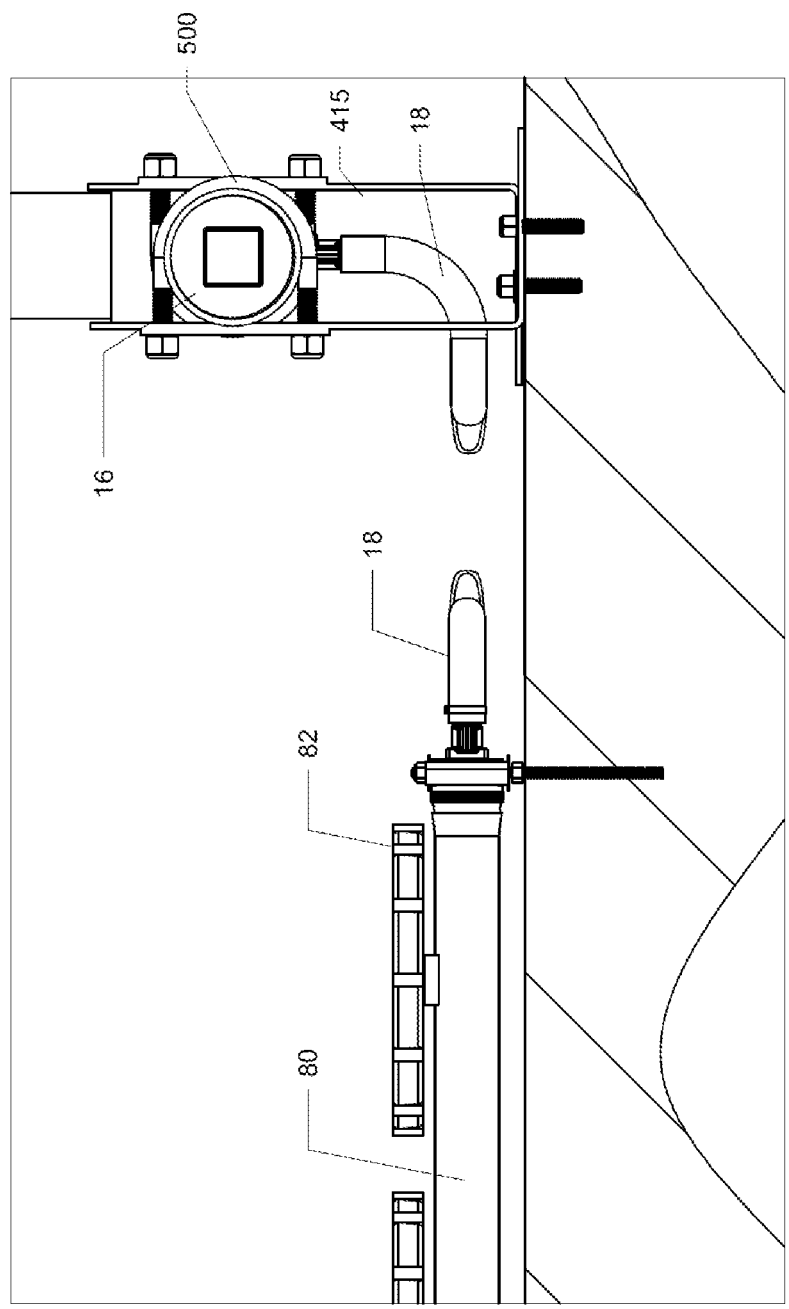

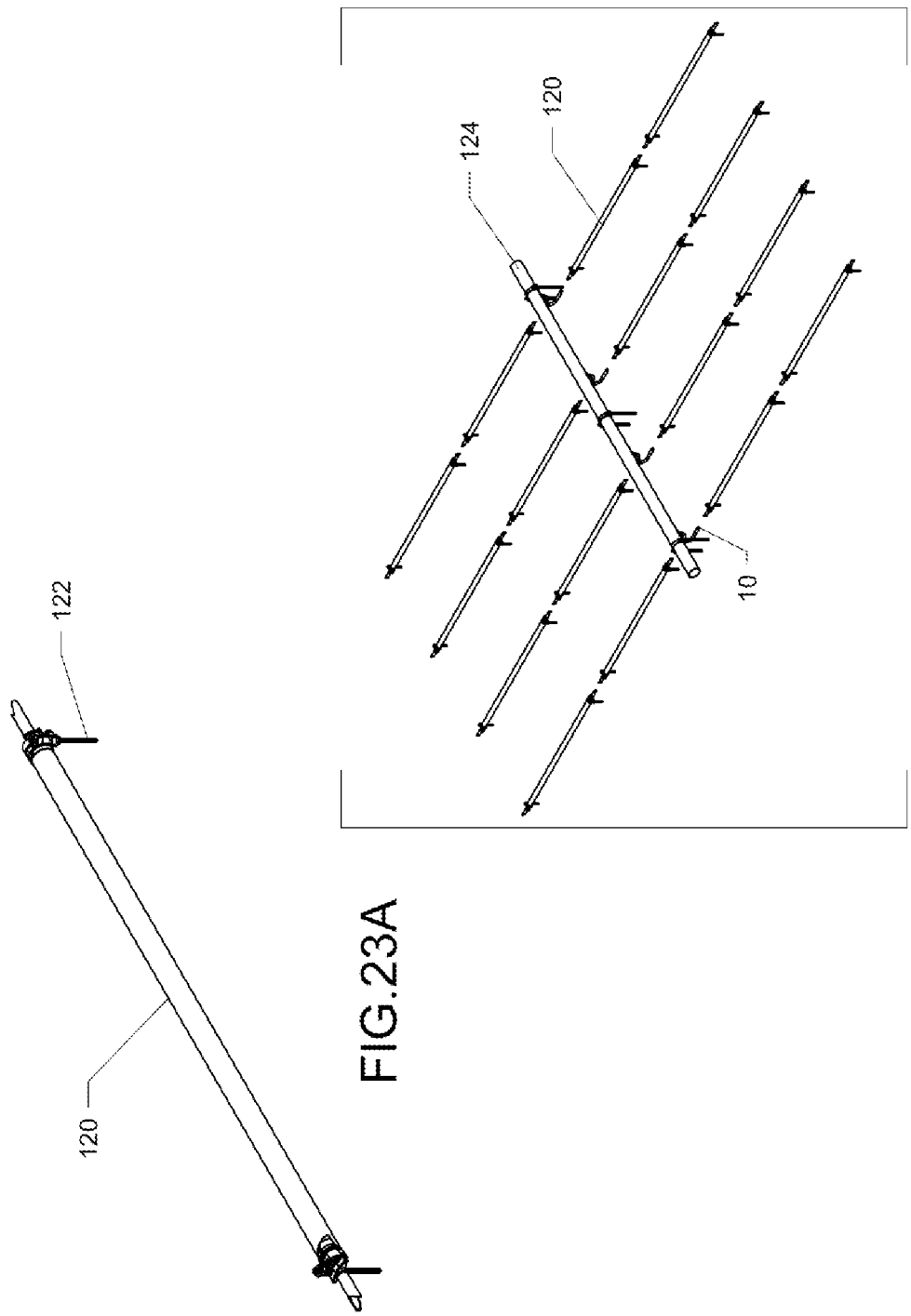

AERATION SYSTEM WITH FLEXIBLE HOSE COUPLINGS

TECHNICAL FIELD

The present invention relates generally to aeration systems for water treatment and more particularly, to an aeration grid system with a flexible hose coupling assembly.

BACKGROUND

Activated sludge systems are used to break down organic solids in wastewater by aerobic digestion from microorganisms (biomass). The organisms are then recycled, and the remaining products are treated water and waste solids. Carbonaceous Biochemical Oxygen Demand (CBOD) is the amount of carbon-based organic matter in the water that is biodegradable. It is measured as Biochemical Oxygen Demand (BOD). Since this organic matter or nutrients deplete oxygen in the water by digestion of aerobic nutrients by microbes, the goal is to remove the organic solids in the water and lower the BOD level. This is also known as BOD removal. The level of BOD is controlled so that the final decanted water can be released into streams or rivers.

The basic equation for treating BOD with the activated sludge process is

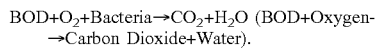

$$BOD+O_2+Bacteria \rightarrow CO_2+H_2O \text{ (BOD+Oxygen} \rightarrow \text{Carbon Dioxide+Water)}.$$

Since the microorganisms use oxygen to break down the suspended solids (SS), oxygen must be introduced into the mixture of water and solids. This mixture is called Mixed Liquor Suspended Solids (MLSS). The amount of oxygen must be great enough for the biomass to break down the solids in the resident time in the waste tank. In order to maximize the amount of oxygen that is dissolved in the water (DO), the oxygen transfer efficiency (OTE) is examined. The more oxygen, the better the biomass can feed and maintain the proper biomass to solids ratio (F:M). The organisms and solids form into an aggregate called floc.

Biological nutrient removal is also a part of the activated sludge process, since nitrogen and phosphorus are elements which can promote the growth of noxious algae in surface waters that received treated wastewater. Another demand of oxygen in an activated sludge process is created by oxidizing ammonia to nitrates (nitrification).

A general formula is:

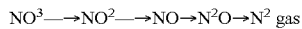

$$NO^3 \rightarrow NO^2 \rightarrow NO \rightarrow N^2O \rightarrow N^2 \text{ gas}$$

Various types of water-treatment apparatus have been developed and are used, for example, in clarification plants/wastewater-processing aerobic digestion tanks. In a typical system, a plurality of aeration elements is connected to a distribution conduit, generally in a fixed, rigid grid structure. The distribution conduit on the one hand serves for the supply of air or gas to the aeration elements, and on the other hand also serves for the securement of the aeration elements. A plurality of distribution conduits can in turn be combined to form a system.

In known systems, tube-, disc-, and/or strip-type diffuser elements are generally arranged and fixed in a rigid grid structure to the bottom of a water treatment tank or to the bottom surface of a treatment pond via specialized brackets or are self-weighted so that the aeration elements remain at the bottom of the treatment tank or pond to be treated. Aeration elements are typically arranged in various types of grid configurations or in zones on the bottom of the water tank or pond to be treated.

Aeration elements in the form of diffusers strips, tubes, or discs, as are commonly used, are consumable in the activated sludge process, and therefore are subject to a great deal of wear and tear, in that the membrane or other material that surrounds the frame or body of the diffuser element can be damaged by movement of the water around the elements. Such aeration elements, therefore, are routinely replaced every 6 to 10 years. The diffuser element frame/body itself can become clogged with debris or even warped over time, or the clamp, bracket, or other element that secures the aeration element to the tank floor can become worn or damaged and require replacement or repair.

As noted above, typically strip, disc, or tubular aeration elements are secured in place to the floor or bottom of a tank or water to be treated, for example, by means of an assembly bracket or other attachment means and are arranged in a grid formation and are connectable to a series of air supply pipes and conduits via a multitude of connectors and joints. These types of arrangements are known as fixed grid diffuser systems. By way of illustration, with one type of assembly bracket, cooperating upper and lower profiled portions are secured around the aeration element at opposite ends of each element, or multiple brackets can also be secured around the pipe along the length of the pipe, and not only at the ends. The assembly bracket is in turn secured to the floor by either an anchor bolt in the center bottom hole directly into the tank floor or by two height-adjustable anchors through the two outer holes to enable leveling of the diffuser to bottom of the tank for maintaining the position of an aeration element. The lateral air supply piping is generally arranged adjacent to a water tank wall periphery of the tank and requires multiple connecting components.

There are a number of disadvantages associated with conventional, fixed grid systems, for example, a conventional fixed grid system utilizing 9" disc diffusers. For example, in typical conventional fixed grid systems, a relatively large number of diffusers are required to achieve the desired effects of water treatment/aeration, with in turn, requires accordingly a relative high number of rigid connecting points and linear footage of lateral air piping. The conventional fixed grid systems generally require a convoluted lateral air pipe system with a multitude of rigid couplings and connection points, which are subject to material fatigue. In particular, the rigid couplings and connection points are prone to wear and ultimate failure especially under oscillating and changing load conditions as well as temperature changes which cause material expansions and contractions. Such conventional systems are complex to install and maintain, and further are prone to mechanical failure. Further, conventional systems require time-consuming installation, in that the air supply piping, conduits, and arrangement of the diffusers must be specifically adapted to or designed for each project, typically on site, thus increasing time and expense for the project.

Further, in convention fixed grid systems that use disc diffusers, system turn down is limited by a system turn down limited by pin hole balancing orifice design. Large scale fixed grid installation of 9" diameter disc diffuser systems require aeration grid balancing, which is achieved by restricting the air flow to each diffuser with a pin hole or 6 mm to 8 mm fixed orifice. That is, system airflows below 1.2 Nm3/h (0.75 SCFM)/per diffuser will lead to partial aeration of the aeration grid, grid collapse, and clogging of diffuser membranes in the long-term. System airflows greater than 2.4 Nm3/h (1.5 SCFM)/per diffuser will cause an exponential increase in backpressure, potentially exceeding the pressure rating of the blower system. Further, such systems are not capable or have only limited capability of nutrient loading driven process design, representing a single point of design regarding Standard Oxygen Transfer Efficiency (SOTE) to a projected nutrient loading optimization on a year 1 to year 20+ planning time scale.

As a result, there is a reduced expected life of the system components, due to operating blow minimum allowable system airflow of typically underloaded treatment planes (40% to 60% of maximum plant capacity). Clogging of diffuser membranes generally is associated with these systems, and as noted above, the conventional, fixed grid 9" disc diffuser systems require a large number of diffusers and necessarily, an equally large number of connecting points and linear feet or meters of lateral air piping.

Further, these systems require a convoluted lateral air pipe system with a multitude of rigid couplings and connection points subject to material fatigue especially under oscillating and changing loading conditions, as well as expansion and contractions caused by temperature changes. Further, conventional disc diffuser membranes used in these systems, as a result, are unreliable and cumbersome to replace in the field. This results in increased downtime of the complete system to replace or repair components as well as increased costs to replace damaged components.

SUMMARY

One object of the present invention is to provide a more efficient, cost effective, easier to install, and resilient aeration system that significantly reduces the required number of air distribution pipes, laterals, joints, couplings, and expansion joints of compared to conventional fixed grid aeration systems.

A further object of the present invention is to replace replaces the majority of flanges, joints, reducers, tees, and elbows of commonly used ridged air distribution systems with flexible hose coupling connecting independently anchored factory assembled large surface area diffuser elements, or disc type diffuser elements pre-assembled to lateral air pipe sections.

According to the present invention, the rigid air distribution joints commonly used in fixed grid aeration systems are instead replaced with flexible air hose connection, thus providing a system that is more resilient against thermal expansion and contraction stress introduced into rigid air lateral system case by oscillating loads in BNR systems, organic loading changes caused by diurnal plant loading patterns, and other environmental factors. With the present invention, no rigid connection to the main air supply line or pipe is required; rather the interconnected tube or strip diffusers are mounted to the floor independently of the main air lateral air supply.

A further object of the present invention to provide a coupling device that is configured to couple the aeration elements to the air distribution conduits and which further are configured to couple at least to one or multiple aeration elements in a single air distribution air supply manifold, a dual air control manifold assembly, or multiple air distribution air supply manifold assembly.

In one aspect, the system according to the present invention contemplates providing, by way of example, 4 zones with a maximum design air flow of 2,500 SCFM/3,925 Nm3/h each. The system further provides only one main air distribution lateral air pipe per zone. In one aspect, the lateral air distribution pipe length is 200 ft./61 m—pipe. The system further provides enhanced air grid balancing by 14" diameter pipe at drop pipe stepped down to 12" diameter pipe, 10" diameter pipe, 8" diameter pipe and 6" diameter pipe over the distribution length.

As a result, the present invention provides one durable, high strength, simple, fast and easy to install cost effective air coupling system that can connect pipes having diameters from 14" all the way down to 3". A further advantage of the system according to the present invention is that all connections and components utilize PVC, that is, all plastic material pipes, and stainless steel pipes. Thus, the additional steps of solvent bonding or steel welding are not required.

The present invention therefore represents a dramatic reduction of diffuser components and lateral air piping in comparison to conventional 9" disc or the previously installed 3" diameter tubular diffuser systems. The equivalent number of diffuser components of 9" or 1 m 3" diameter tubular diffusers based on equal SOTE performance and design airflow overactive membrane area as illustrated in FIG. 29, per tank & plan view layout:

According to a further aspect, the system according to the present invention preferably uses low-pressure applications at operating pressures of 150 kPa [22 PSIG] or less.

According to another aspect, the system according to the present uses a flexible rubber grommet, or dowel-like connection, for tapping and connecting a wide range of pipe diameters (for example, diameters of 2"/DN50, 3"/DN 80, 4"/DN 100, 6"/DN150, 8"/DN 200, 10"/DN 250, 12"/DN 300, 14") to a flexible air hose.

According to further aspects, in the system according to the present invention, the rubber saddle or grommet is inserted into a hole in the air supply pipe having at least a 1¼" [31.0 mm] hole or greater. A male pipe nipple, preferably a tapered pipe thread/NPT, is inserted into a female port of the rubber saddle or grommet. The length of the tapered pipe nipple is at least x 1½ or longer in relation to the nominal thread diameter. The pipe nipple expands the rubber grommet, when fully inserted, to form an airtight seal between the pipe hole and the grommet. The grommet expands to a far greater diameter than the insertion hole of the air pipe forming a mechanical lock preventing the grommet/hose coupling from being pushed out by the internal pipe system pressure or by external pull forces.

In further aspects, the grommet has circumferential saw tooth like recesses allowing for easy insertion but preventing pulling out. The grommet may match the contour of the pipe diameter/wall to prevent spinning during insertion of the male pipe nipple and for a firm connection. The male nipple has a hex, or wing nut and a hose barb, hose compression fitting, or female threaded port on the opposing side connecting to a preferably flexible hose made of Vinyl, braided cord reinforced Vinyl, HDPP, braided rubber hose, or else. The coupling size can vary from, for example, ½", 1", 1½', to 2", for different airflow capacities.

The coupling assembly and aeration system that utilizes the coupling assembly according to the present invention provides a cost efficient, flexible, and adaptive alternative to the known coupling assemblies typically used in aeration systems, and offers further advantages with regard to the configuration, assembly, and functioning of the aeration system that utilizes the coupling assembly. Further, the coupling assembly can be part of a prefabricated aeration system that facilitates installation and maintenance, while providing more efficient aeration effects for water treatment applications, as will be described in greater detail below.

BRIEF DESCRIPTION OF THE DRAWINGS

FIG. 1A shows a common arrangement in a conventional disc diffuser assembly; FIG. 1B shows a common arrangement in a conventional tube diffuser assembly; and FIG. 1C shows a configuration of long strip diffusers;

FIGS. 6A and 6B show views of the coupler, grommet, and flexible hose connected to an air supply pipe;

FIGS. 16C and 16D show side views of the mounting assembly for the disc diffuser modules;

FIG. 23A shows a tube diffuser and FIG. 23B shows a configuration of tube diffuser modular sections and directly anchored to the basin floor independent from the main air supply lateral pipe for connection to a central air supply pipe and in series to one another via the coupling assembly according to the present invention;

DETAILED DESCRIPTION OF THE EXAMPLE EMBODIMENTS

Overview

Embodiments disclosed herein provide systems and methods for water aeration in a tank or other body of water that a specialized coupling assembly and flexible hose connectors rather than the commonly used rigid connector elements. The coupling assembly and flexible hose connectors utilized in the aeration grid system according to the present invention provide a more cost effective and flexible system that allows almost limitless configurations of the diffuser elements, depending on the intended application. Further, the coupling assembly and flexible hose connectors enable use with a wide variety of air supply pipe diameters without the necessity of providing a fitting or adapter for each pipe opening. The capability of the aeration system to be readily adapted to different sizes of treatment tanks or ponds, for example, allows the installation and use of a more flexible, prefabricated, or modular, and ultimately more efficient aeration system, compared to those known in the state of the art.

Figure 1C:
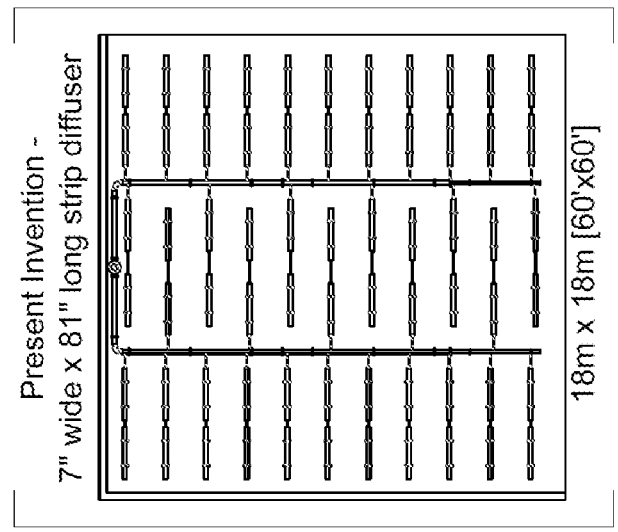
FIGS. 1A-1C show top plan views of possible configurations of diffuser assemblies on the bottom of a treatment tank or body of water.
Figure 1B:
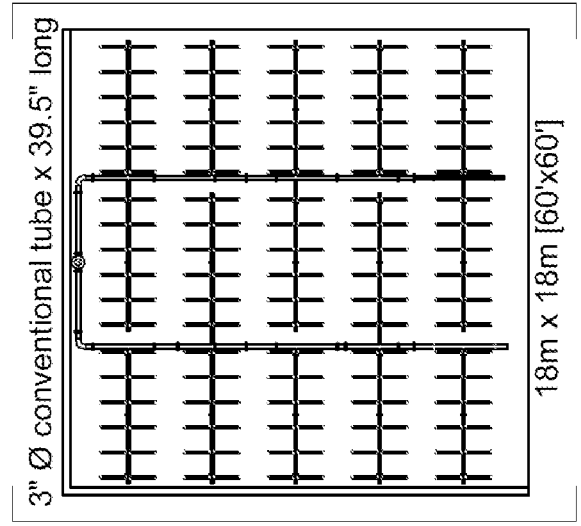
Figure 1A:
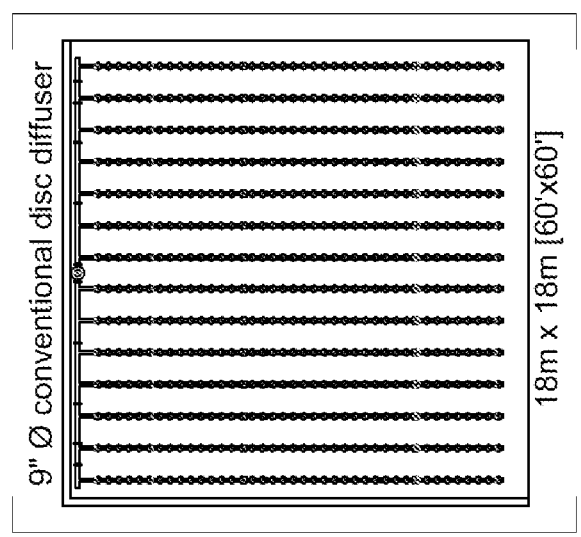

To better illustrate one of the advantages of the aeration system and coupling assembly used therein according to the present invention, FIGS. 1A through 1C show conventional aeration system assemblies and one possible configuration of aeration elements according to the present invention. In particular, FIG. 1A shows a conventional arrangement of a series of disc diffusers in a top, plan view with conventional 9" diameter diffusers arranged in an 18 m×18 m grid on the floor or bottom of a water tank, for example. The diffusers are fed with a primary air supply pipe or conduit, typically positioned along one wall of the tank, so that the diffusers, mounted in series on air supply pipes (not shown), extend in rows in the tank. Each air supply pipe onto which the diffusers are mounted are connected via a rigid pipe or joint connection to the primary air supply pipe.

FIG. 1B shows an aeration assembly, again in a top plan view of the floor of a water tank, arranged in an 18 m×18 m grid and using conventional tube diffusers of 3" diameter and 39.5' long. Again, a main air supply pipe 16 is positioned at one wall of the tank and in this arrangement, extends further pipe into the tank. Additional air supply pipes connected to the main supply pipes provide air to the tube diffusers connected thereto. As with the system shown in FIG. 1A, rigid connectors and joints are required to connect the diffusers to the air supply pipes, thus enabling only a limited number of configuration options.

FIG. 1C shows one potential configuration of the aeration grid system according to the present invention and utilizing the coupling and flexible hose assembly. Specifically, FIG. 1C shows an 18 m×18 m grid using 7" wide and 81" long strip diffusers. The strip diffusers can be alternatively connected along lateral air supply pipes with the coupling and flexible hose assembly, thus optimizing the placement of the diffusers in the tank for more efficiently aeration. The strip diffusers shown in this example are connected via the coupling and flexible hose assembly not only to the air supply pipes but also can be connected end to end in series as needed.

With reference to the grid systems shown in FIGS. 1A-1C, it was found that the required installation time of the strip diffuser system according to the present invention and as shown in FIG. 1C was approximately only ⅓ of the installation time compared to the convention 9" disc diffuser system of FIG. 1A and ½ of the installation time of the conventional tubular diffuser system shown in FIG. 1B.

Figure 1D:
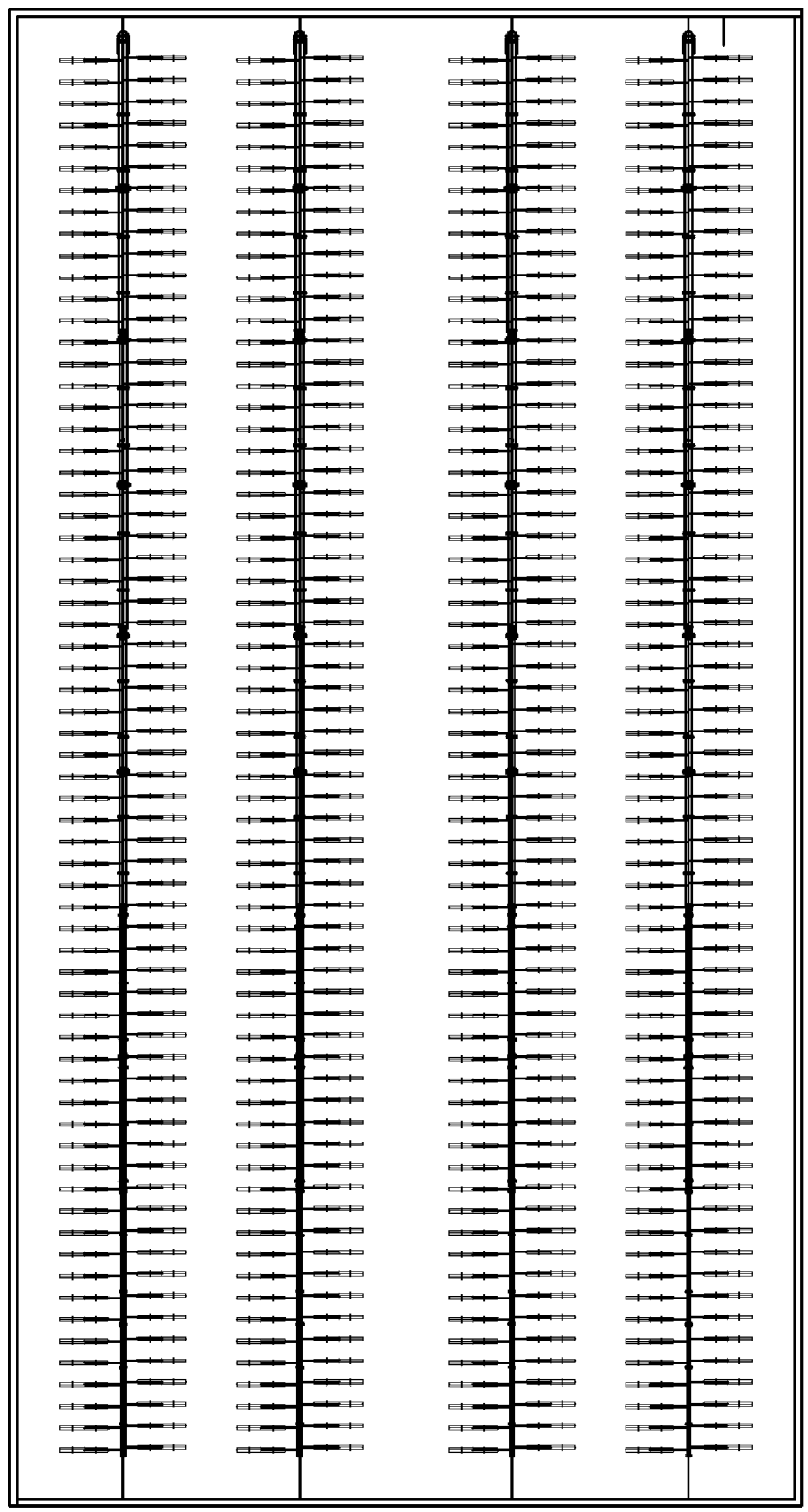
FIG. 1D shows a possible configuration of the system of the present invention utilizing a lateral air pipe system design and air pipe coupling.

As will be described in greater detail below, and as initially shown in FIG. 1D, the system of the present invention utilizes a lateral air pipe system design and air pipe coupling. Preferably, the grid system is formed into four zones with a maximum design air flow of 2,500 SCFM/3, 925 Nm3/h each. Only one main air distribution lateral pipe per zone is provided. Preferably, the lateral air distribution pipe length is 200 ft./61 m pipe. Enhanced air grid balancing is provided with 14" diameter pipe at drop pipe stepped down to 12" diameter, 10" diameter, 8" diameter, and 6" Ø over distribution length. One durable, high strength, simple, fast, and easy to install & cost effective air coupling system connecting from 14" Ø all the way down to 3" Ø pipe. Connecting to PVC, all plastic material pipes, & stainless-steel pipes. No solvent bonding or steel welding required.

As will be described further below, the flexible hose coupling connects independently anchored, factory-assembly large surface area diffuser elements, modules, or disc type diffuser elements that are pre-assembled to lateral air pipe sections. According to the present invention, no rigid connection to the main air supply line or pipe is required; rather the interconnected tube or strip diffusers are mounted to the floor independently of the main air lateral.

Automatic Purge System

As will be described in further detail below, the system according to the present invention further provides a moisture purge assembly for the aeration elements that is continual and independent of the fill level of the tank. Traditional manual eductor purge line systems function only at maximum water depth. Traditional purge lines operate on a differential similar to a manometer. When the water level drops, there is not enough differential pressure inside the air header piping to lift the condensate high above the water level. Traditional purge lines therefore require frequent manual opening of the system's eductor valve. Often, an entire piping grid may not be purged. Traditional purge lines have a single sump to accumulate condensate. Air velocity may trap condensate away from the sump, and airflow to the grid may have to be temporarily shut off to allow condensate to collect in the sump.

In contrast, with the purge system utilized in the aeration system of the invention, the coupling systems are positioned to be directed downwardly from the bottom of the air supply pipe, preferably between an angle of 30° to 90°. The header pipe is thus positioned to be at a higher elevation than the diffuser element in order to purge out any condensation water. The automatic purge system operates at any water depth, i.e., variations in water depth do not affect operation. The purge system operates automatically, in that any time air is flowing to the system, condensate is being purged. As noted above, the lateral air pipe is positioned at a higher elevation, and as will be described in greater detail below, each diffuser is equipped with purge perforation lines on its underside to ensure that the condensate in every air header pipe is evacuated.

Strip Diffuser Aeration Elements, Module and Connection

In one embodiment, the grid aeration system according to the present invention may utilize a flattened, elongated aeration element having support member with a substantially oval cross-section, an elastomeric and flexible tubular membrane having air slits provided only on a top surface of the aeration element when the membrane is placed around the aeration element, and an air inlet with a threaded connection to connection the aeration element to a distribution conduit that serves for the supply of gas or air. Reference is made to U.S. Pat. No. 9,370,753, the contents of which are incorporated herein by reference in their entirety.

The support member of the aeration element is made up of a rigid, hard plastic material having a corrugated, hollow profiled and with corrugated outer surfaces, such that a plurality of grooves is formed between the ridges of the corrugated surfaces, both on the inner and outer surfaces of the support member.

The aeration element is provided with a clamp for retaining in place the membrane and further, the support includes a machine bead to prevent the clamp from slipping and to maintain the membrane under an axial, lengthwise tension, thereby preventing the membrane from slipping off the support member during use.

The aeration element can be provided with a check valve in the form of an opening in the upper surface of support member which works in cooperating with a flexible, elastomeric membrane or flap to perform a back flow or check valve function that presents sludge and other materials, in the event the membrane was accidentally breached, or cut by an hard object floating in the sludge or during assembly of the system or operators servicing the system. However, liquid from condensation, or backflow through the membrane is prevented from entering into the air supply system when the air is shut off during an intermitted cycle for de-nitrification and/or an anaerobic phase of the operating batch cycle of the biological processes sequence.

The aeration element further is provided with a mounting or support bracket for supporting or fixing in position the end(s) of the elongated aeration element when in use in an aeration system in a clarification tank or pool/pond, for example, by securing the mounting or support bracket to a floor or other surface of the tank or pool.

Pursuant to a particularly advantageous embodiment of the invention, aeration elements are respectively disposed in pairs on opposite locations on the distribution conduit, whereby in a given cross-sectional plane, the distribution conduit is provided at two oppositely disposed locations with bores through which a single bolt passes that connects the two aeration elements with one another. In this way, the support of the bolt relative to the wall of the distribution conduit is affected by the respective other aeration element. The aeration elements thus reciprocally support one another, and the apparatus can make do with a minimum number of parts.

It is also contemplated that the two head pieces of the aeration elements are pressed into the extruded profiled secured with a rubber liner or friction gasket, rather than using screws or bolts to secure the assembly. The head piece's conical section, or wedge, protrudes into a friction gasket, whose inside contour is funnel shaped. By pressing in the wedge-shaped section of the head piece, the friction gasket expands outwards against the inner contour of the hollow corrugated hard plastic extrusion, forms a seal and fastens the head pieces securely into the corrugated extrusion pieces. The high friction (coefficient) and the expansion of the rubber gasket/friction assembly mount prevent the assembly from coming apart again.

The head piece and corrugated profile can also alternatively be fused together by gluing, welding, friction welding and over-molding.

As shown in the figures and as described below, the flexible hose coupling assembly of the present invention may be used to connect at least one or more strip diffuser modules in series to one another (i.e., end to end) and/or to the air supply manifold by attachment to the coupling assembly to the head piece of the strip diffuser.

The aeration elements also can be secured in place by means of an assembly bracket having cooperating upper and lower profiled portions that can be secured around the aeration element. The assembly bracket is in turn secured to the floor by either an anchor bolt in the center bottom hole directly into the tank floor or by two height-adjustable anchors through the two outer holes to enable leveling of the diffuser to bottom of the tank for maintaining the position of an aeration element. It is contemplated that a plurality of brackets can be utilized along the length of the aeration element, rather than only on its ends.

In view of transport and assembly considerations, aeration elements having shorter lengths are contemplated. Two of these shorter aeration elements can be connected at their adjacent ends, when the aeration elements are placed adjacent one another, a connection line, such that one aeration element function as an air conduit to one or more aeration elements. With this configuration, buoyancy of the aeration elements is reduced. Shorter length modules of aeration elements can more easily be transported, handled and installed.

When utilizing the coupling assembly of the present invention, a large surface can be an oval tubular, flattened strip diffuser module with one or more mounting brackets independently anchored from the air lateral system, such that the strip diffuser module is anchored to the floor of the tank, for example.

Strip Diffusers with Dual-Air Control Manifold Using Coupling Assembly

The aeration grid system and coupling assembly according to the present invention is also contemplated in use with strip diffusers using a dual-air control manifold. The dual air control manifold system provides a more efficient aeration element that has a greater cross-sectional area available, that offers greater longevity and resilience, and which is capable of being mounted in new or existing aeration systems in a variety of configurations. Reference is made to U.S. Pat. No. 10,105,659, which is incorporated herein by reference in its entirety.

Preferably, the dual air control lateral air manifold assembly includes at least two offsets, stacked conduit elements arranged within a single conduit mounting assembly in order to provide a cost-effective and space-saving arrangement of the air supply conduits relative to the aeration elements. The assembly provides a high efficiency fine bubble aeration of the water to be treated, in combination with low power consumption supplemental mixing with submerged or floating mixers.

The dual control lateral air manifold assembly is contemplated for use in aeration tank applications, such as class activated sludge flow through, tapered aeration zone and Sequencing Batch Reactor (SBR) designs. Further, the assembly can be used in oxidation ditch applications, including upgrades and retrofits and provide up to a 50% energy savings of mechanical mixing aerators. A further advantage relates to the energy efficient loading scalability by combining high efficiency fine bubble aeration with low energy consumption submerged mixing.

As noted above, a significant advantage associated with the dual control lateral air manifold assembly is its flexibility and scalability with regard to its applications in water treatment facilities.

The flexible hose coupling assembly can be used effectively with the dual control lateral air manifold assembly, as will be described below with reference to the figures. Using the flexible hose coupling assembly of the present invention, at least one or more strip diffuser modules may be connected to the dual air supply manifold and if needed, in series to each other.

Detailed Description

Figure 2A:
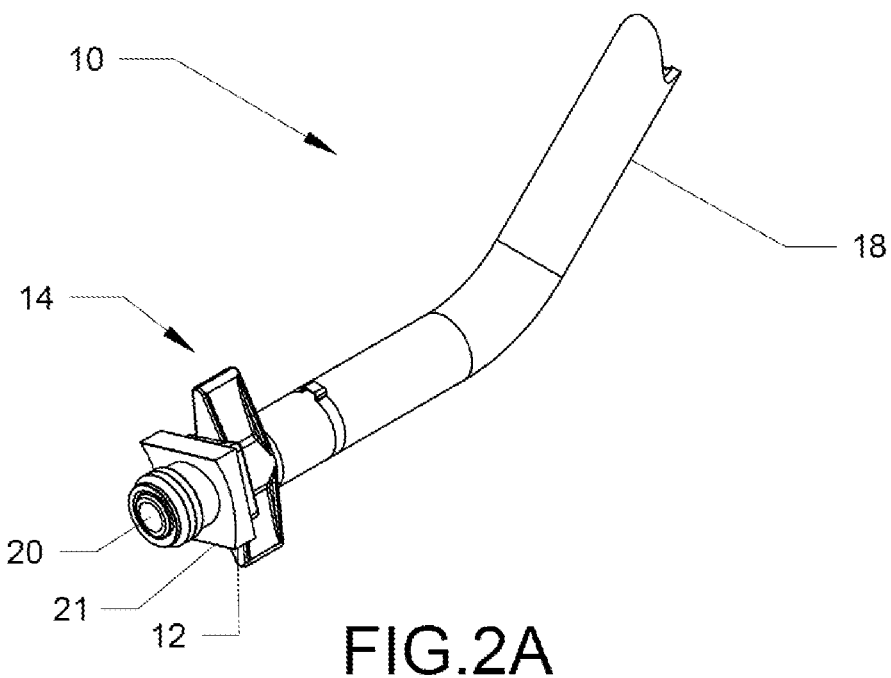
FIG. 2A shows the flexible hose, grommet, and coupler according to the present invention in an assembled state.
Figure 2B:
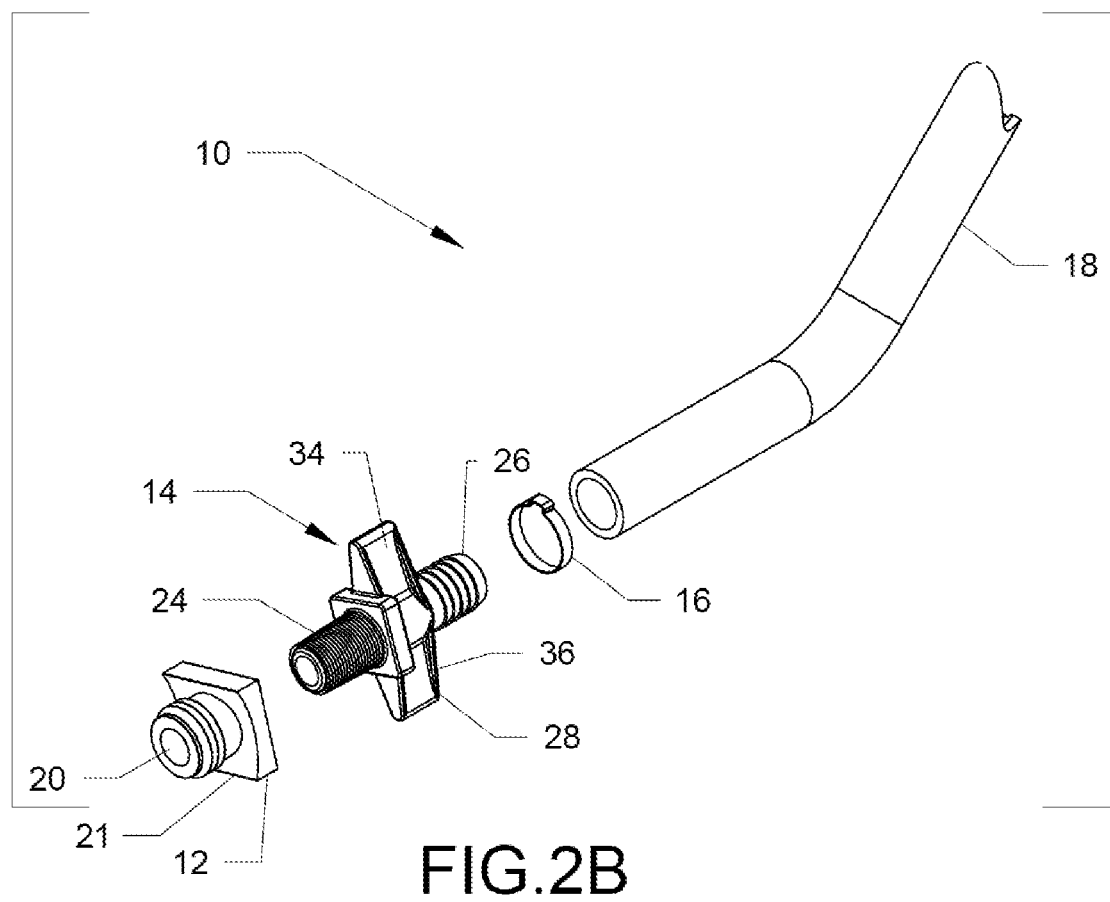
FIGS. 2B and 2C show the flexible hose, grommet, and coupler of FIG. 2A in an exploded view.

Turning now to the figures, FIGS. 2A and 2B show the coupling assembly 10 according to the present invention. The coupling assembly includes a mounting saddle 12, a hose barbed connector or fitting 14, a clamp 16 (crimped or tightening bolt style (stainless steel or hard plastic to secure the hose on the hose barb connector or fitting 14, and a flexible hose 18. The mounting saddle 12 preferably is made of a flexible elastomeric material and has a top, planar surface 20 with a central hole for receiving the hose barbed connector 14, a bottom, concave surface 21 for contacting the surface of an air supply pipe, and a threaded end 20 for insertion into a hole formed in an air supply pipe (described below). The diameter of the threaded end 20 is formed to be slightly larger than the hole in the pipe into which the saddle 12 will be inserted. The bottom surface 21 is formed so that when the threaded end 20 is inserted into the air supply pipe hole, the bottom surface 21 is flush against the outer surface of the air supply pipe. The hose barbed connector 14 includes a first and second threaded ends 24, 26 and a central barbed or T-shaped section 28 from which the first and second threaded end portions 24, 26 extend.

Figure 2C:
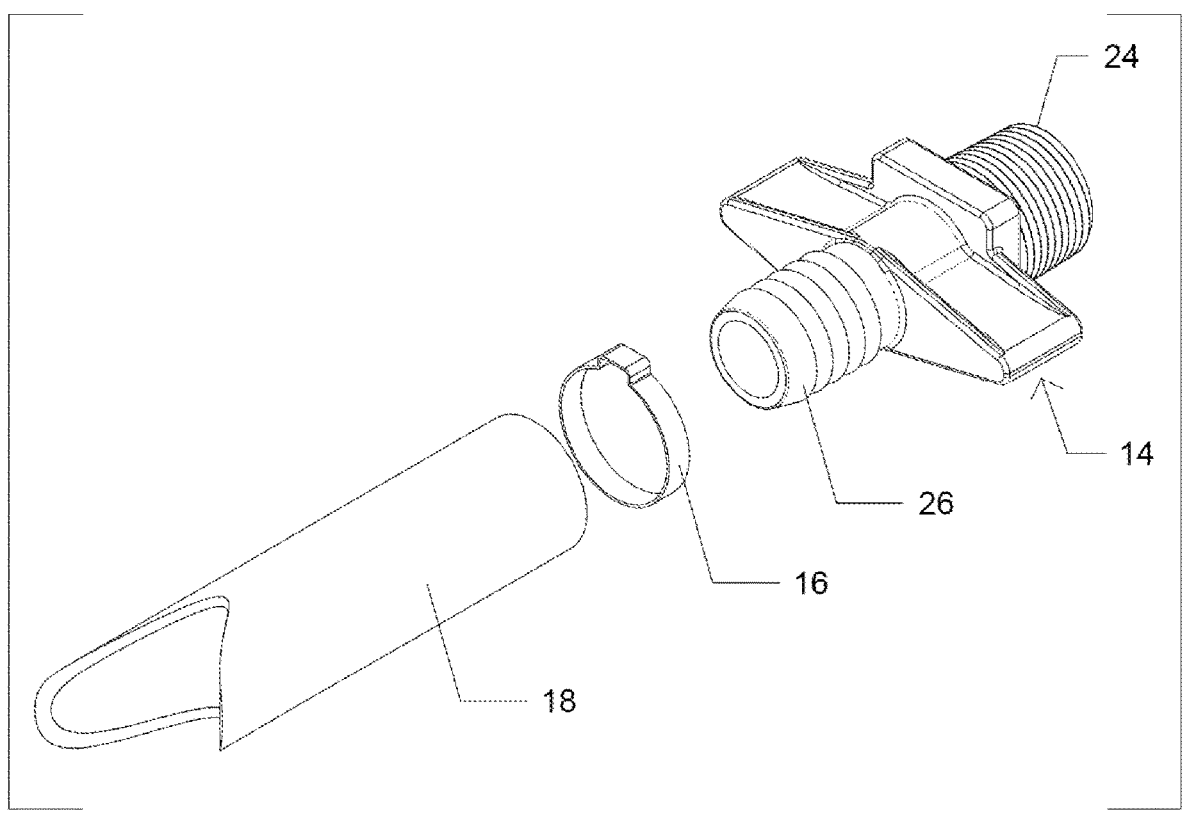

As best shown in FIGS. 2A-2C, the connector 14 includes a threaded male connection 24 and a barbed male connection 26. The hose barbed connector 14 preferably is made from a lightweight PVC/plastic material. The threaded male connection 24 is configured to be received, that is screwed into the hole formed in the top surface 20 of the mounting saddle 12, while the barbed male connection 26 is configured to receive the end of a flexible hose 18. The central barbed or T-shaped section 28A has oppositely disposed arm portions 34, 36 joined to a base section 38, the arm portions 34, 36 configured to facilitate insertion or screwing in of the barbed connector 14 into the saddle 12. A mounting clamp 16 may be used to ensure proper connection of the flexible hose 18 to the second barbed end 26, as shown in FIG. 2B.

Figure 3A:
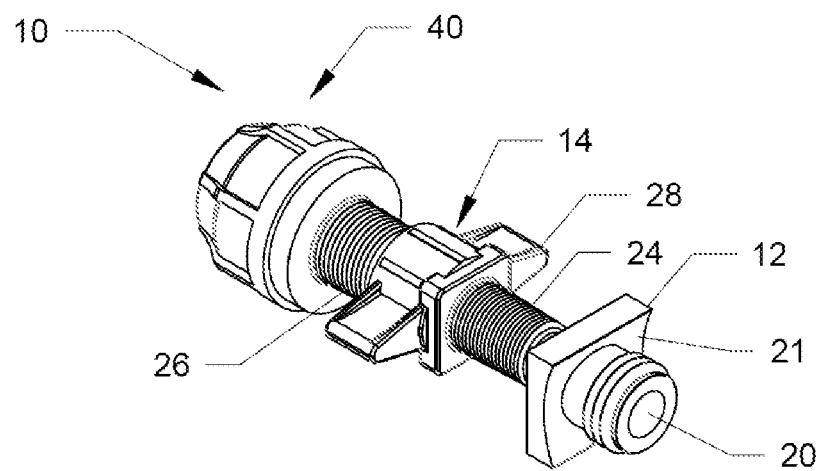
FIG. 3A shows a coupling assembly in an assembled state.
Figure 3B:
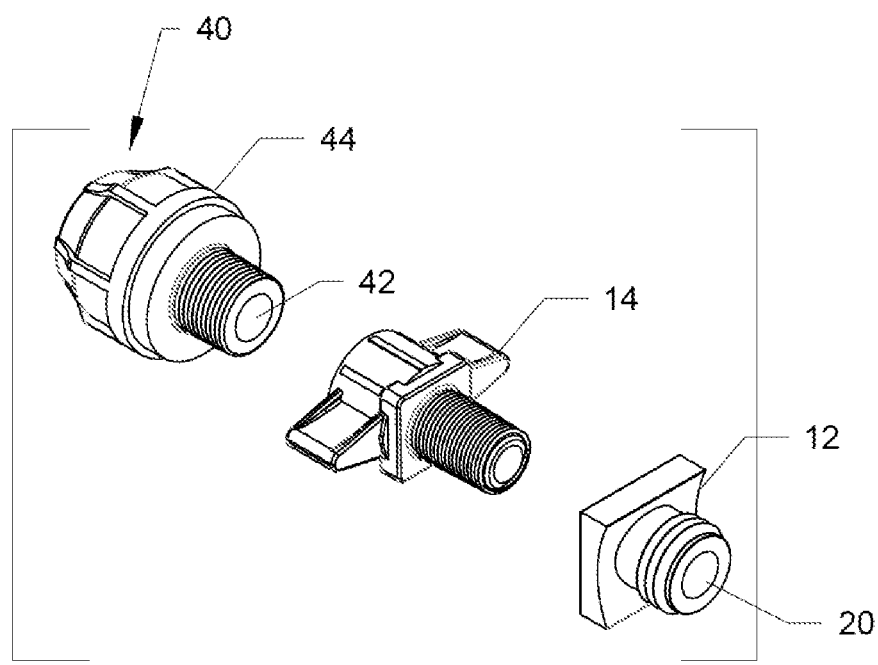
FIG. 3B shows the coupling assembly of FIG. 3A in an exploded view.
Figure 3C:
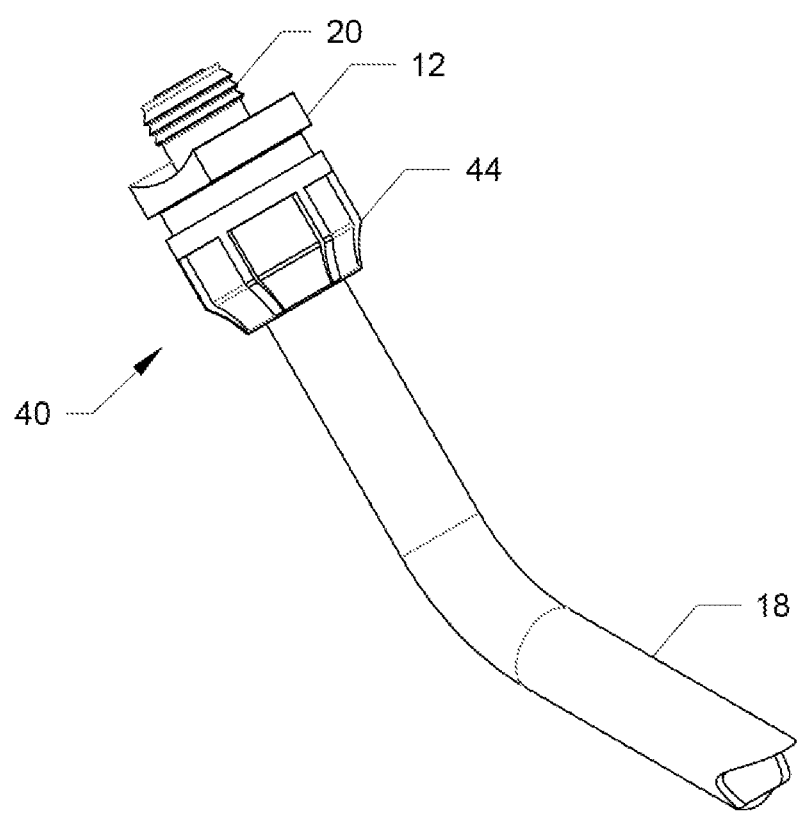
FIG. 3C shows the coupling assembly of FIGS. 3A and 3B connected to a flexible hose.

FIGS. 3A-3C show further aspects of the coupling assembly 10. In addition to the mounting saddle 12 and connector 14, the coupling assembly 10 may further include a compression hose adapter 40. Hose adapter 40 includes a threaded end 42 and central body section 44. The body section 44, on a side opposite that of the threaded end, includes a threaded opening (not shown) for receiving the flexible hose 18 (FIG. 3C). It is contemplated that the adapter 40 is used in applications where accommodation of flexible hoses of different diameters are being used.

Figure 4:
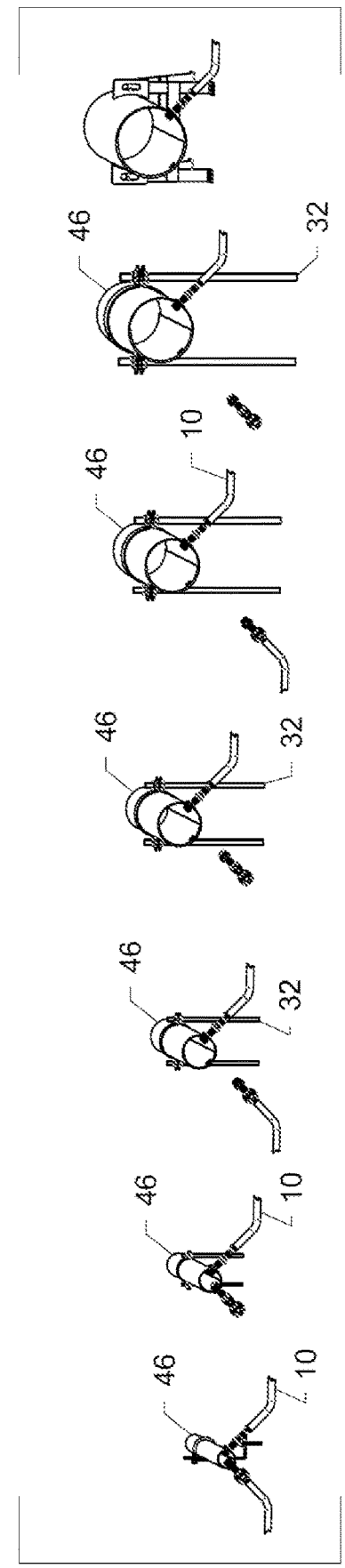
FIG. 4 shows the coupling assembly in place in a series of air supply pipes of increasingly larger diameter.

As described above, and with reference to FIG. 4, the flexible coupling assembly may be used with a variety of air supply pipes having different diameters. FIG. 4 shows one example of air supply pipes 46 having increasingly larger diameters positioned in mounting brackets 32 and with the coupling assembly 10 mounted thereto.

Figure 5:
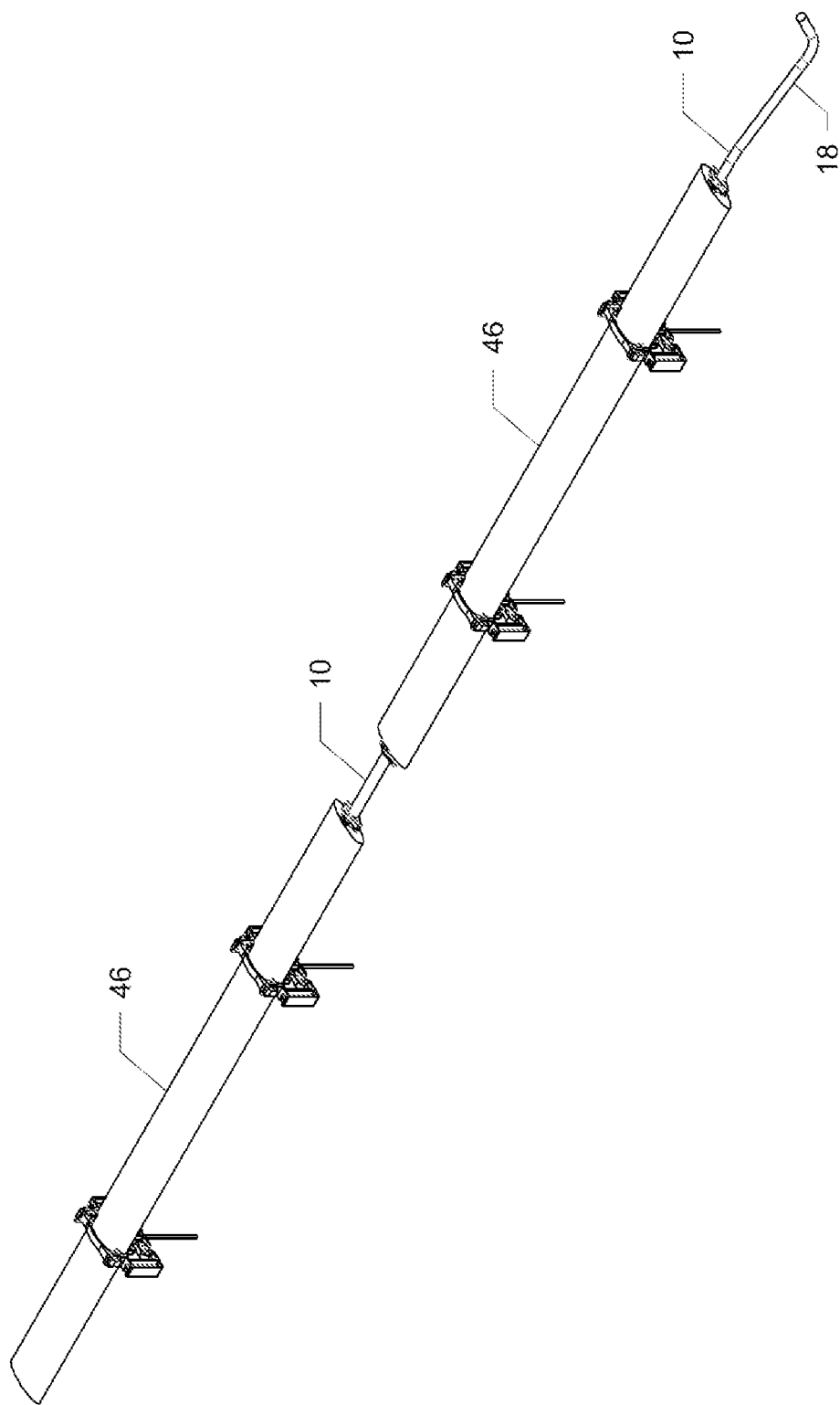
FIG. 5 shows a series of elongated diffuser strips connected to one another via the flexible hose and coupling assembly.

FIG. 5 shows two strip diffuser aeration elements 48, as described above, connected end-to-end using the coupling assembly 10 according to the present invention.

FIG. 6A shows an air supply pipe 52 positioned in a mounting bracket 54, which in turn is mounted to the floor or bottom of the water tank. FIG. 7A illustrates the flexible coupling assembly in an exploded view, with the mounting saddle 12 inserted into a receiving hole in the air supply pipe 52.

Figure 6B:
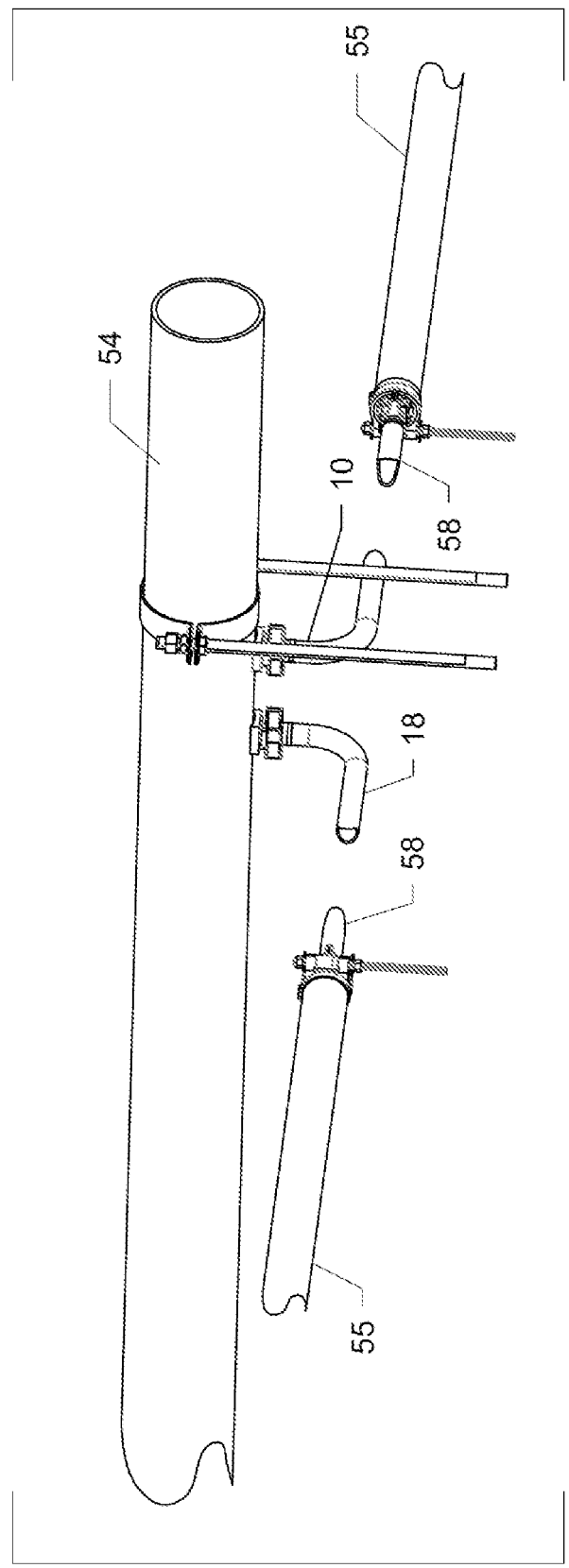

FIG. 6B shows a further configuration for using the flexible coupling assembly 10 of the present invention. Here, two coupling assemblies are positioned at the bottom of a primary air supply manifold 54, and preferably extend away from the manifold 54 at an angle of between 30° and 90°. FIG. 6B further shows tube diffuser assemblies 55 positioned for attachment to the flexible hose 18, and thus to the air supply manifold 54. The tube diffuser assembly 55 is equipped with a hose barb or hose compression coupling 58 on one or both ends. Generally, the tube diffuser assembly is independently anchored to the floor of the tank or basin with one or more cradle supports brackets 60 made of glass fiber reinforced polypropylene PP-GF, glass fiber reinforced Nylon-Polyamide PA-GF, other high impact strength plastics, or a stainless-steel U-Bold or clamp shell cradle support. One or more tube diffuser assemblies 55 may be connected by the flexible coupling assembly 10 to main air supply manifold 54. Further, two or more tube diffuser assemblies may be interconnected by the flexible coupling assembly 10. As described above, the primary air supply manifold 54 may be mounted at a higher elevation than the tube diffuser assemblies 55 to assist in condensation purge.

Figure 7:
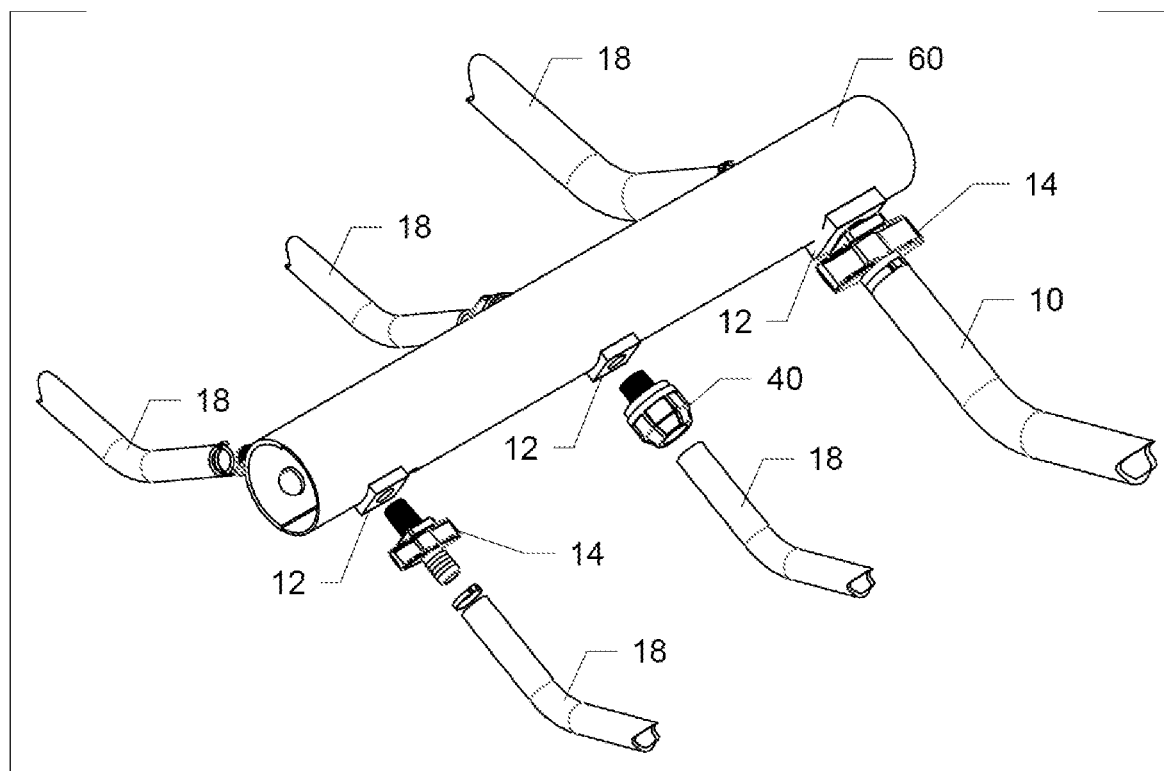
FIG. 7 shows a plurality of coupling assemblies in use with an air supply pipe with the coupler attachments positioned on opposites sides of the supply pipe.

FIG. 7 shows another configuration of an air supply manifold 60 and the coupling assembly 10 positioned along the length of the manifold 60 on opposite sides. FIG. 7 best shows the various configurations that are possible with the components of the coupling assembly 10. FIG. 7 also illustrates how the coupling assembly 10 may extend downwardly and at an angle away from the manifold 60 for attachment to the diffuser assemblies (not shown).

Figure 8:
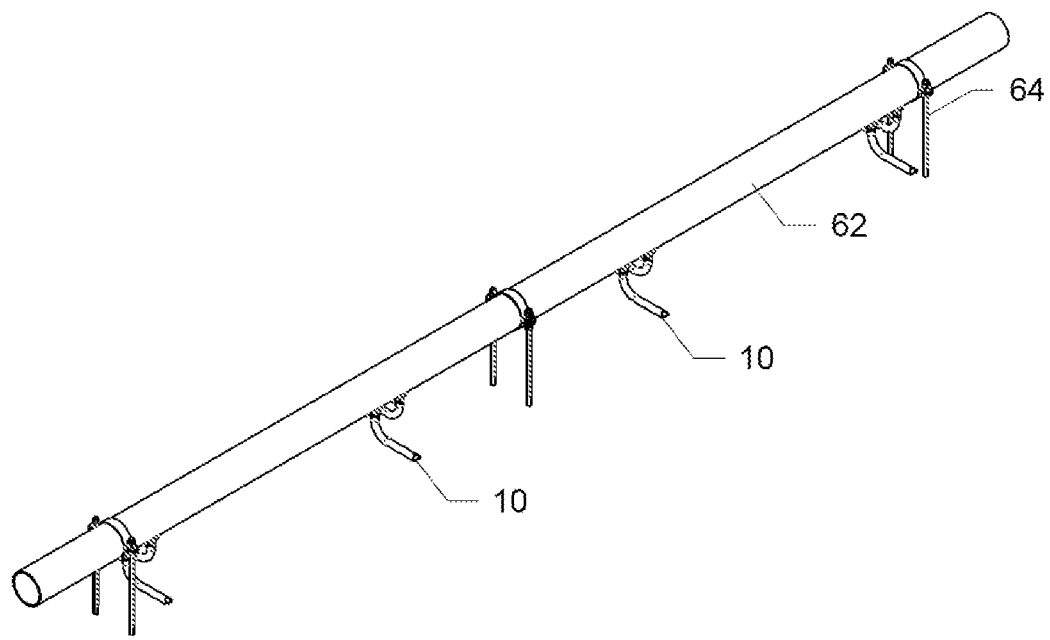
FIG. 8 shows a plurality of coupling assemblies positioned along the bottom of an air supply pipe.

FIG. 8 shows an air supply manifold 62 secured in mounting brackets 64 for further attachment to the floor of the basin or tank. FIG. 8 further show the coupling assemblies 10 connected to the manifold 52 along the bottom of the manifold 62.

Figure 9:
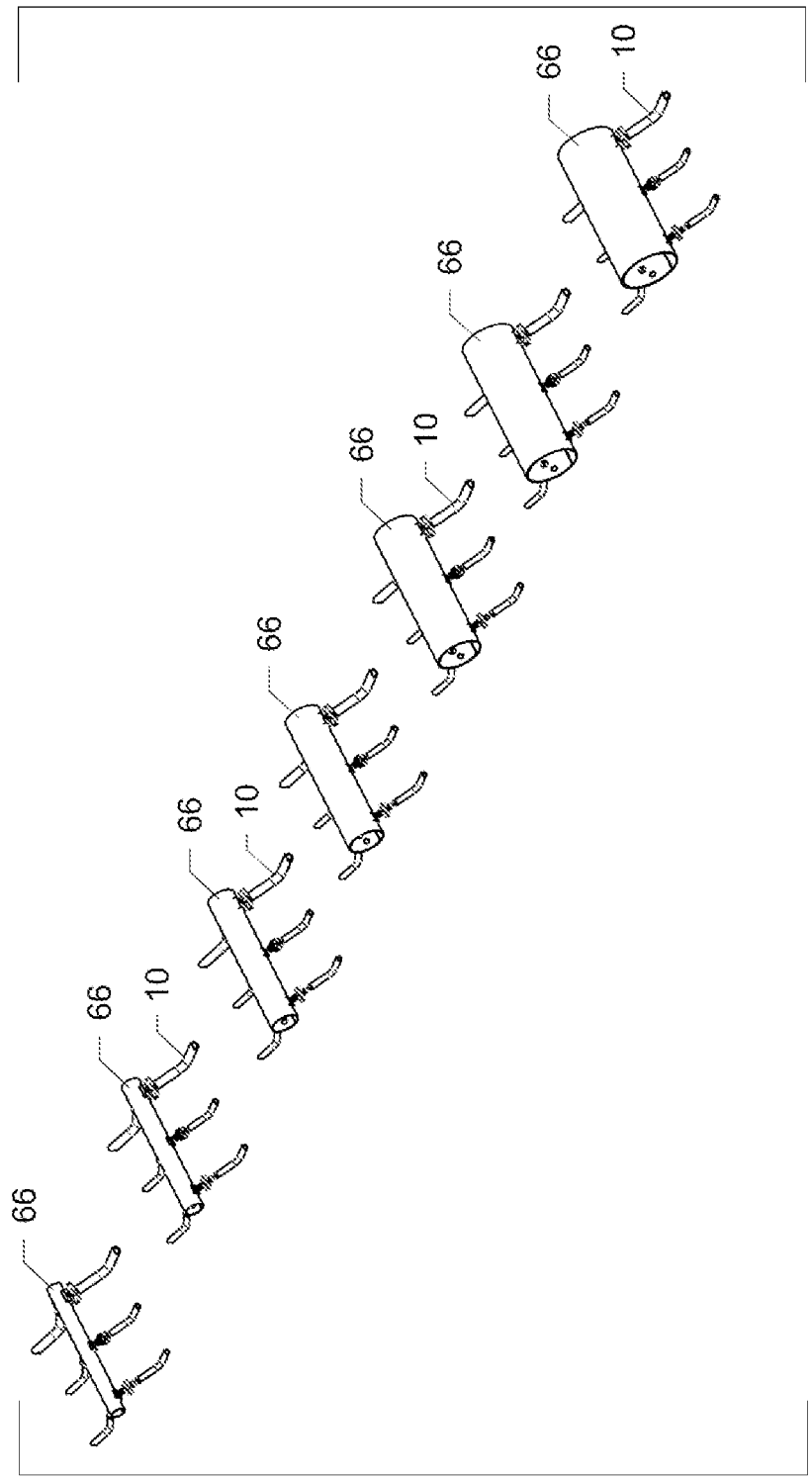
FIG. 9 shows the coupling assembly utilized in series on various air supply pipes having different diameters.
Figure 10:
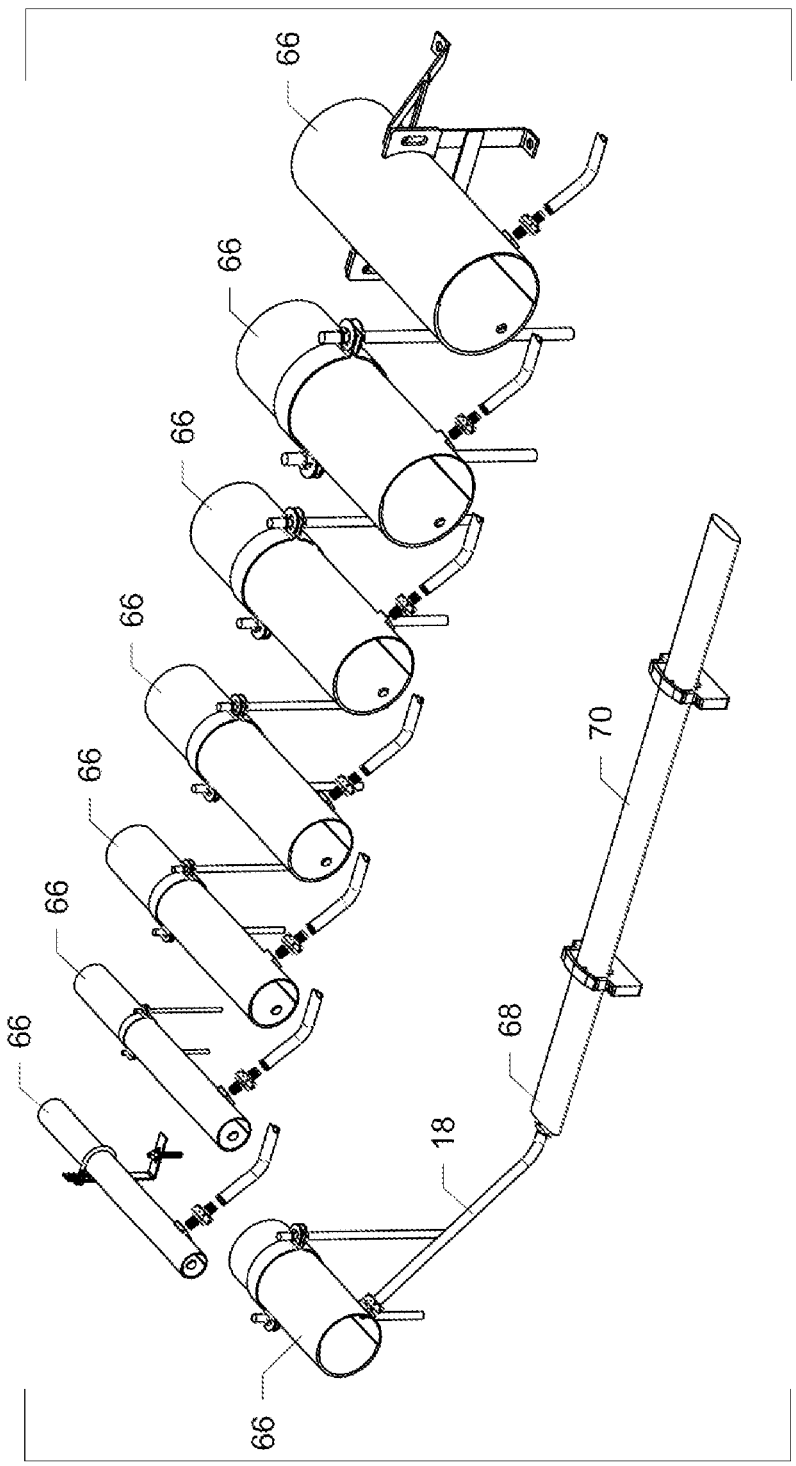
FIG. 10 shows the coupling assembly utilized in series with various air supply pipes of different diameters, as well as a strip diffuser connected to the air supply pipe via the coupling assembly of the present invention.
Figure 11:
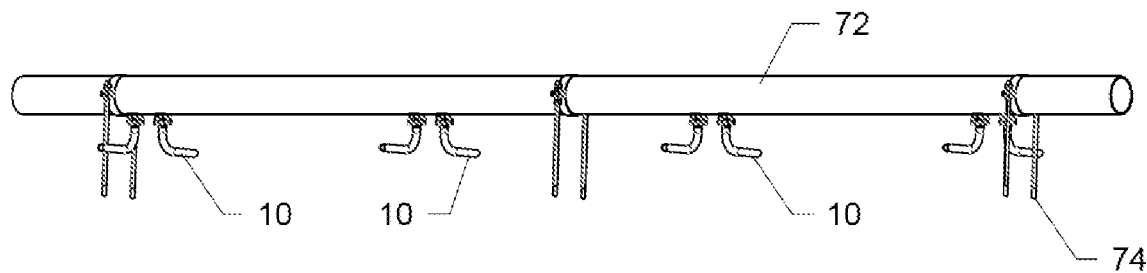
FIG. 11 shows an air supply pipe positioned in a mounting bracket and with the coupling assemblies positioned along the bottom of the air distribution lateral pipe.

FIGS. 9 and 10 illustrate how the coupling assembly 10 according to the present invention may be used with air supply manifolds 66 having various pipe diameters, i.e., the coupling assembly 10 with its described components—the saddle 12, the hose barbed connector 14, and flexible hose 16 and/or adapter 40—may be used on pipes/manifolds of practically any diameter within a diffuser system, thus providing flexibility and time- and cost-savings to the system and operators. FIG. 10 further shows an example of a diffuser 70 connected to a manifold 66 by means of the coupling assembly 10. As shown in FIG. 11, by way of example, the diffuser 70 is a strip diffusor and is connected at one end 68 to the flexible hose 18.

FIG. 11 shows a further possible configuration of an air supply manifold 72 secured in mounting brackets 74, and with coupling assemblies 10 positioned on the bottom of the manifold 72 to extend outwardly and downward to opposite sides of the manifold 72.

Figure 12:
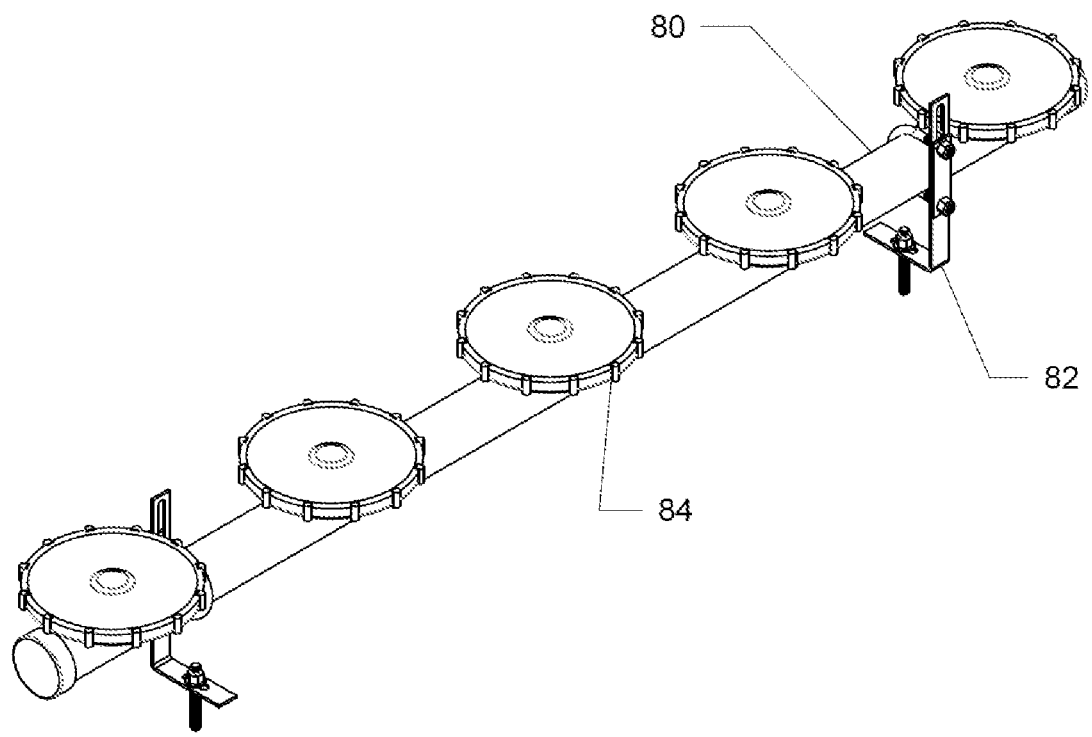
FIG. 12 shows an air supply pipe using factory pre-installed disc shaped diffusers.

FIG. 12 shows a configuration of disc diffuser pipe section 80 positioned in mounting brackets 82 with a plurality of disc-type diffusers 84 connected to the top of pipe section 80.

Figure 13A:
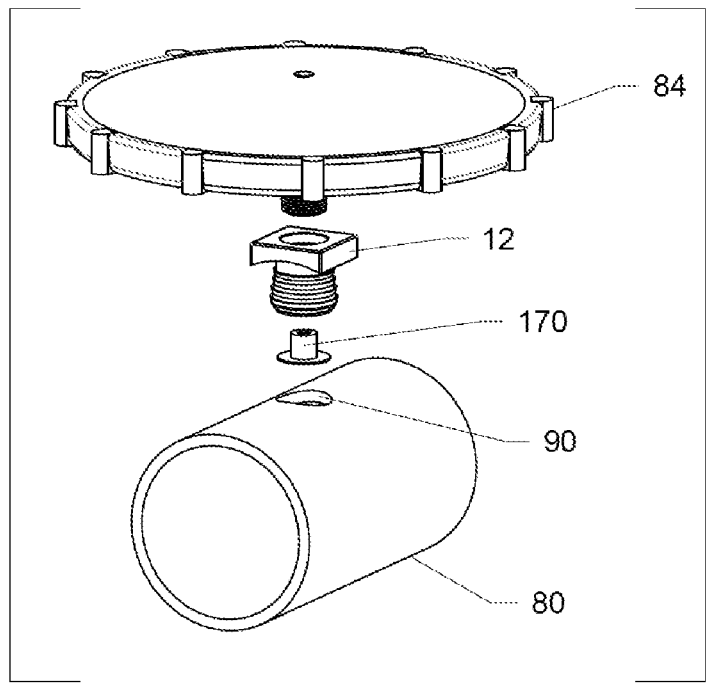
FIGS. 13A-13D show various views of a modular section of an air supply pipe using factory pre-installed disc shaped diffusers and components an air supply pipe using disc shaped diffusers.
Figure 13B:
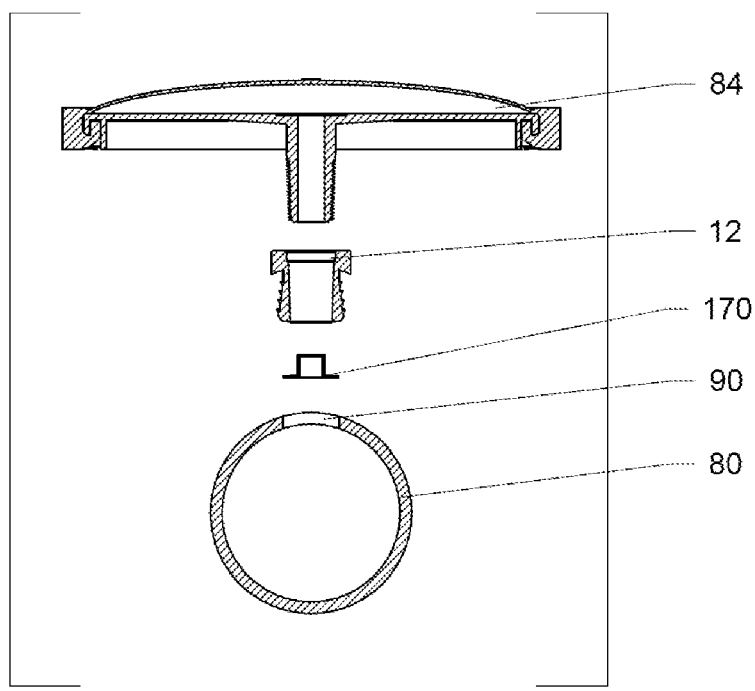
Figure 13C:
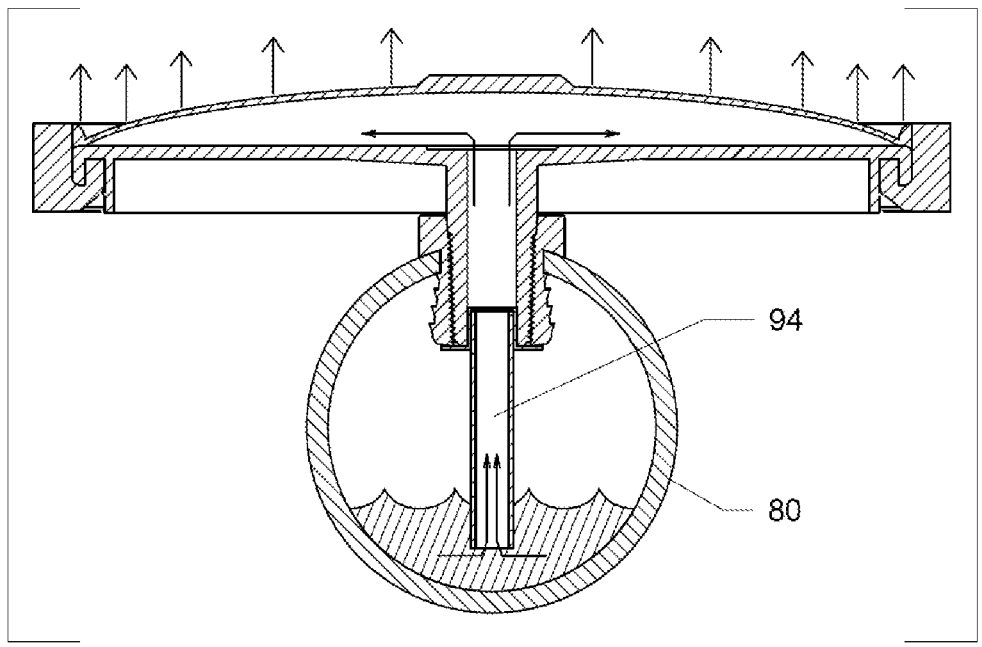
Figure 13D:
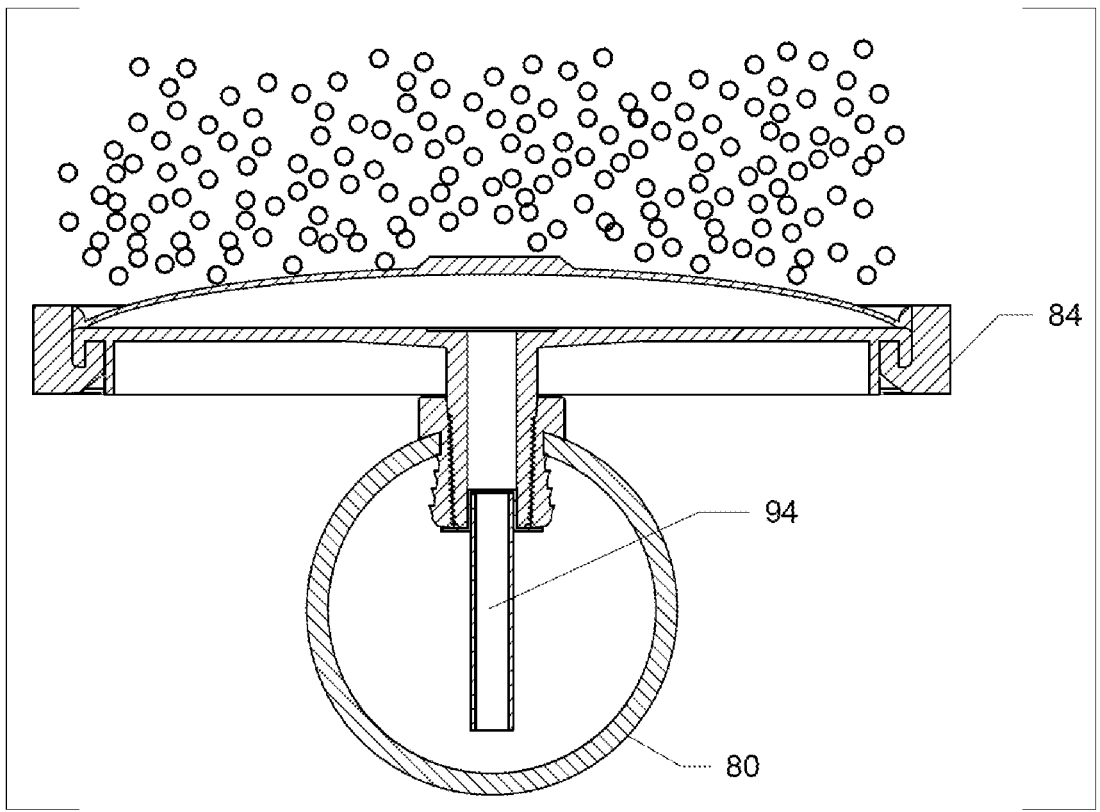

As shown in FIGS. 13A-13D, the disc diffuser 84 may be mounted to the top of the manifold or pipe section 80 using the mounting saddle 12 described above. The disc diffusor, 84, specifically, is mounted to the manifold or pipe section 80 using a prefabricated mounting saddle 12, and a balancing orifice 170, as best shown in FIGS. 13A and 13B. As further shown in FIGS. 13C and 13D, the individual disc diffusers 84 are mounded to the pipe section 80 by the flexible rubber grommet connection or saddle or a glued ridged or mechanical locked mounting saddle 12 with a female tapered port 90. The disc diffuser element 84 is threaded into the female tapered pipe port 90, as best shown in FIG. 13A. Each disc diffuser is fitted with a preferably ⅛" [3 mm], ¼" [6 mm], or ⅓" [9 mm] fixed restricting orifice to allow only a limited volume of air to be released by each diffuser to balance the diffuser rid for even air release of all diffusers. As shown in FIG. 13B, a drainer stem 94 is inserted into each disc diffuser pipe nipple. The length of the stem leaves preferably a ⅛" [3 mm] to ¼" [6 mm] gap between the end of the stem and the bottom inner wall of the pipe so any condensation water collecting at the bottom of the pipe will be pushed up into the stem and into the diffuser for condensation purge, as described above.

A disc diffuser module may be composed of one or more disc type diffusers 84 factory mounted to a i.e., 2.2 m/7' long preferably 2", 2½", or 3" Ø PP, PVC, ABS or stainless steel pipe section 80. The disc diffuser pipe section module may be equipped with a hose barb, hose compression coupling on one or both ends. The disc diffuser pipe section 80 is independently anchored to the basin's floor with one or more mounting brackets 82, shown in FIG. 13 as cradle supports brackets that can be made of glass fiber reinforced polypropylene PP-GF, glass fiber reinforced Nylon-Polyamide PA-GF, other high impact strength plastics, or stainless-steel U-Bold or clamp shell cradle support. One or more disc diffuser pipe section modules are connected by flexible hoses and hose couplings to main air supply manifold. Two or more disc diffuser pipe section modules are interconnected by the flexible coupling assembly, i.e., the flexible hoses and hose couplings, described above. The main air manifold is mounted at a higher elevation than the disc diffuser pipe section modules for condensation purge.

Figure 14A:
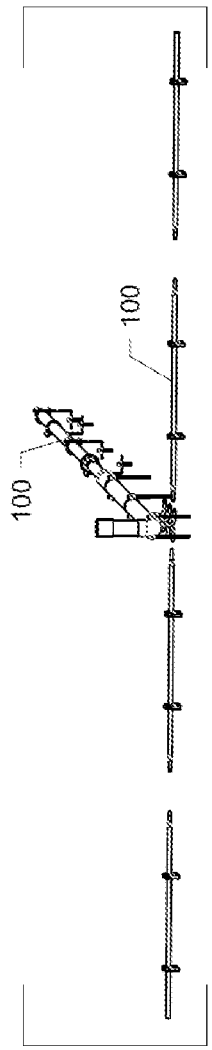
FIGS. 14A and 14B show a possible configuration of the air supply line connected via the coupling assembly according to the present invention to a series of strip diffusers.
Figure 14B:
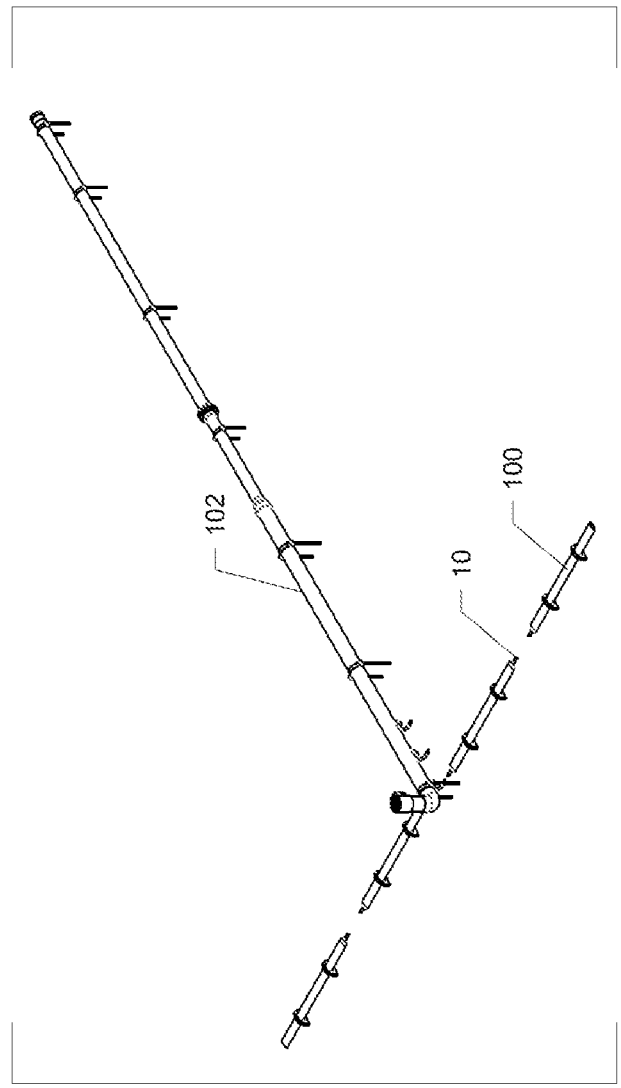

FIGS. 14A and 14B show further possible configurations of strip diffusors 100 connected to one another in series via the coupling assembly 10 and connected to the main air supply manifold 102.

Figure 15:
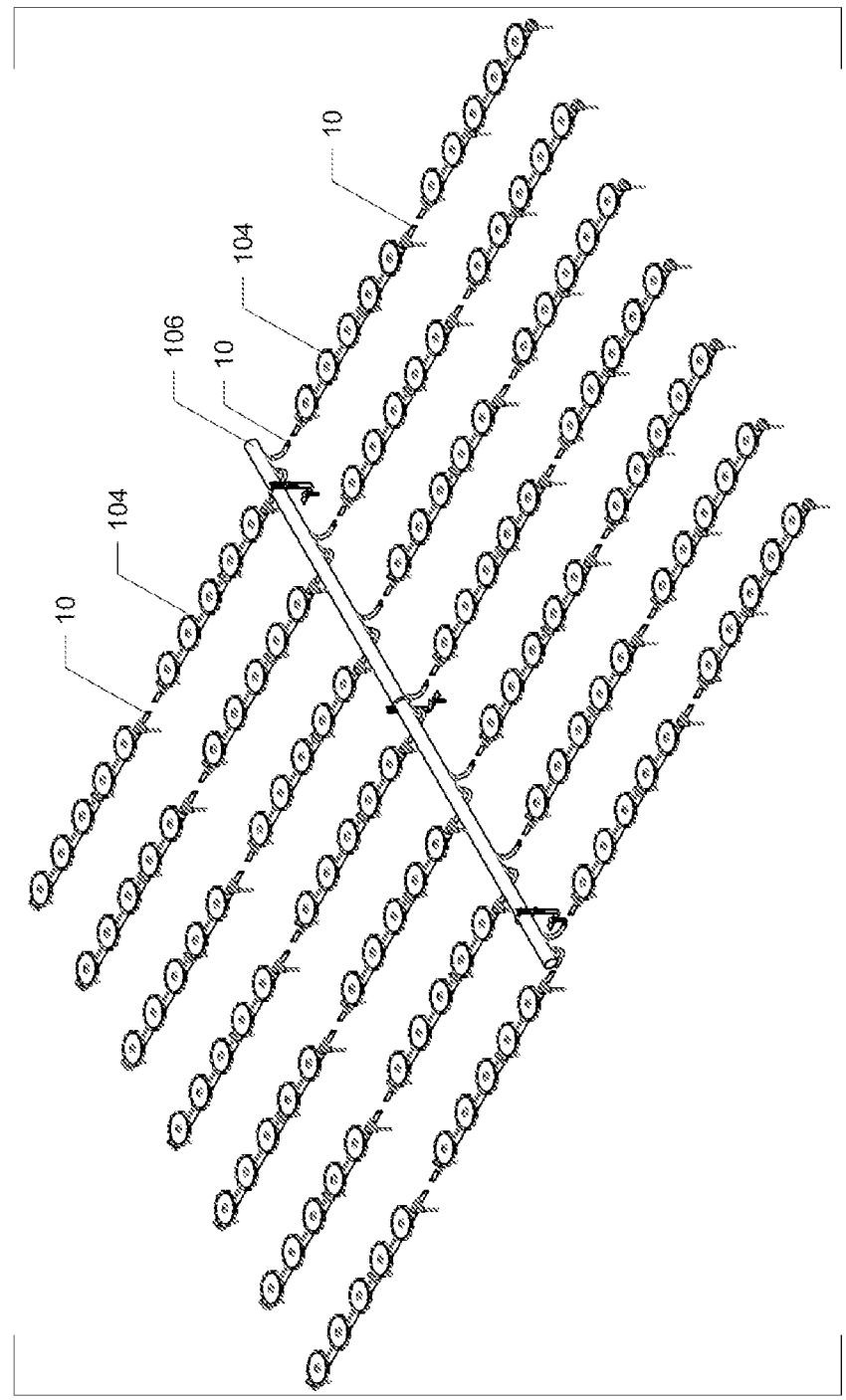
FIG. 15 shows a possible configuration of the air supply line connected via the coupling assembly of the present invention to a series of disc diffusers factory pre-installed onto modular pipe sections and directly anchored to the basin floor independent from the main air supply lateral pipe.

FIG. 15 shows a possible configuration of the air supply line connected via the coupling assembly of the present invention to a series of disc diffusers factory pre-installed on to modular pipe sections, preferably of 2.2 m [7 feet] length, and directly anchored to the basin floor independently from the main air supply lateral pipe, preferably at lower elevation than the main air lateral supply pipe.

Figure 16A:
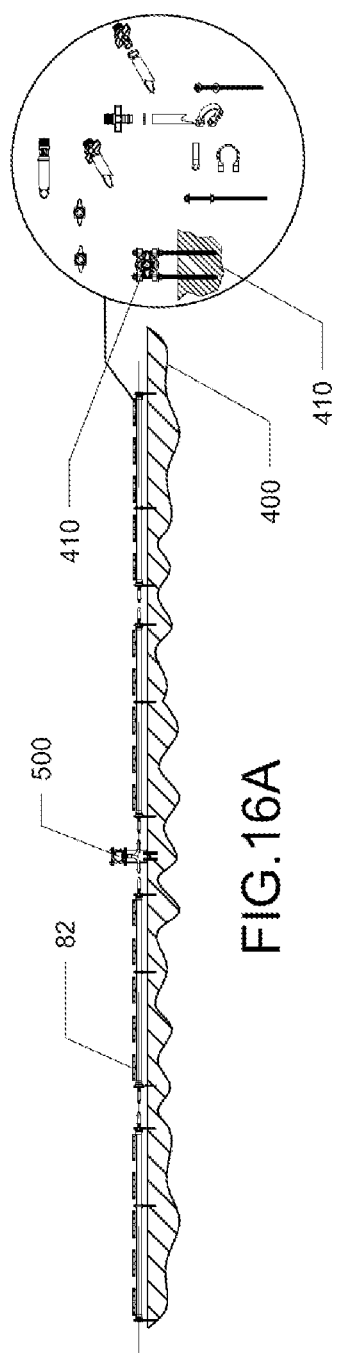
FIGS. 16A and 16B show side and top views, respectively, of disc diffuser modules and includes a detail of the mounting bracket/clamp system.
Figure 16B:
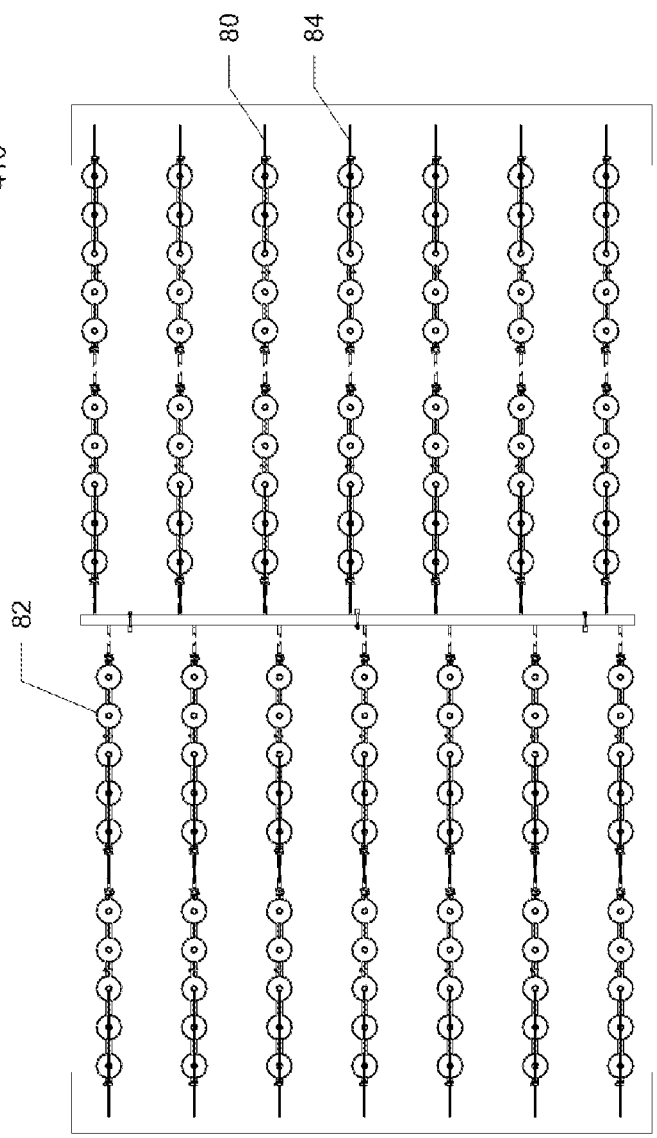

FIGS. 16A-16B show a further configuration and arrangement of the modular disc diffusor sections 610. More specifically, FIG. 16C shows details of the mounting bracket and clamp assembly 410 for securing the manifold 80 with the disc diffusors 82 mounted thereon. Mounting bolts 415 are secured in the basin floor 400 and inserted into cooperating openings in oppositely position clamps 420 that are positioned around the manifold or pipe section 80.

Figure 16D:
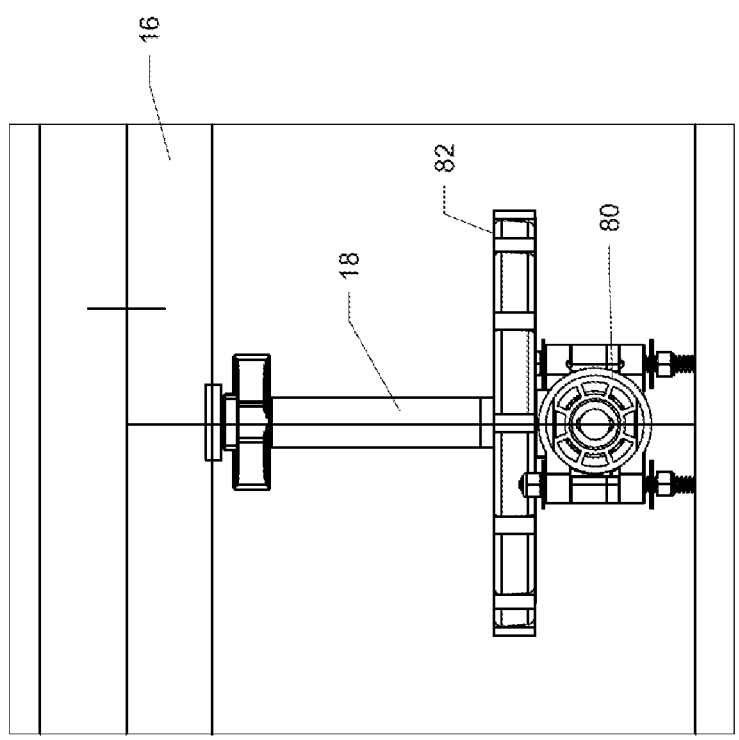

FIG. 16D shows an end view of a diffuser section and the clamping assembly around the air manifold or pipe section 80.

Figure 17A:
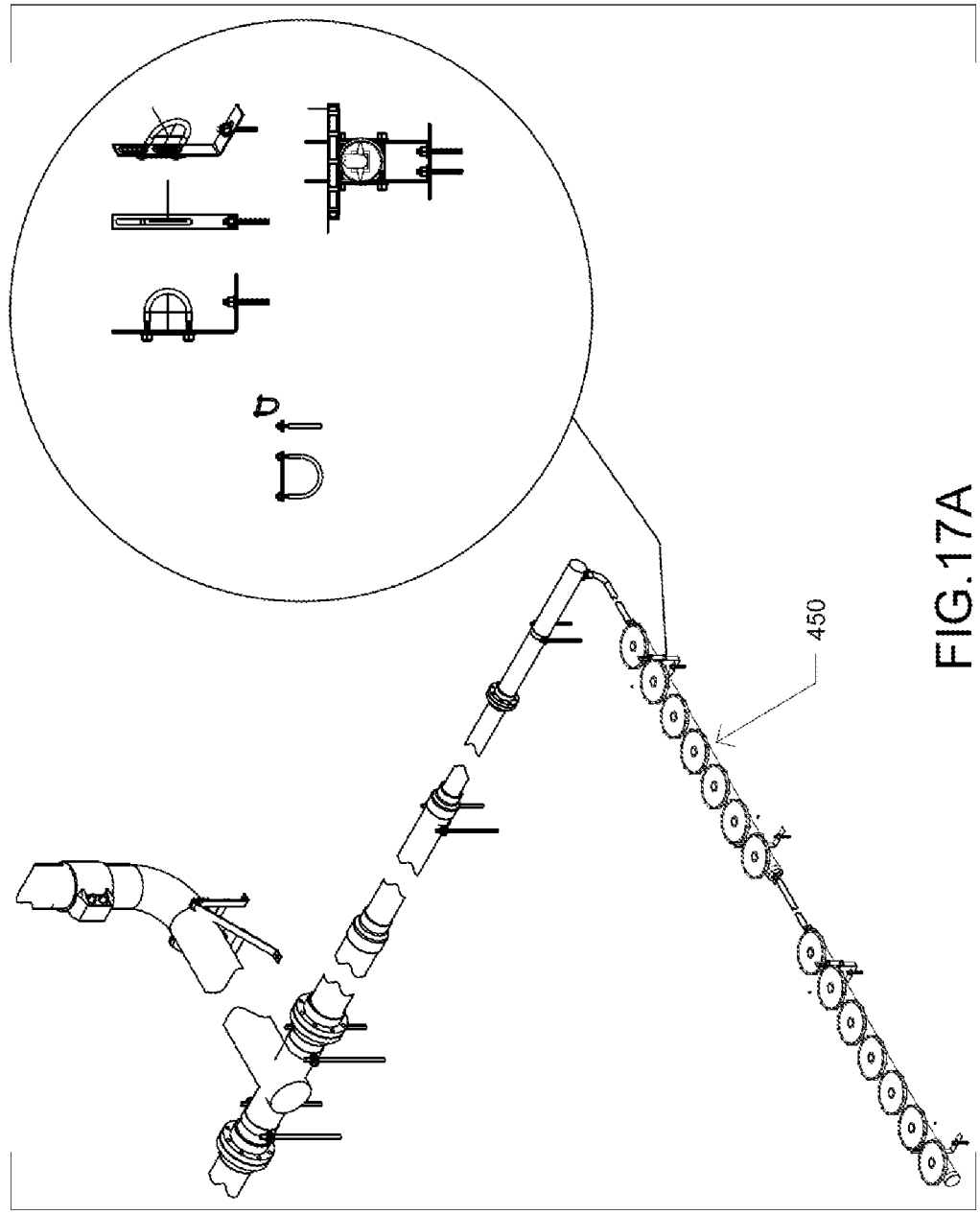
FIGS. 17A-B show details of the mounting clamps/brackets for anchoring the manifold and pipe section to the basin floor and/or wall.
Figure 17B:
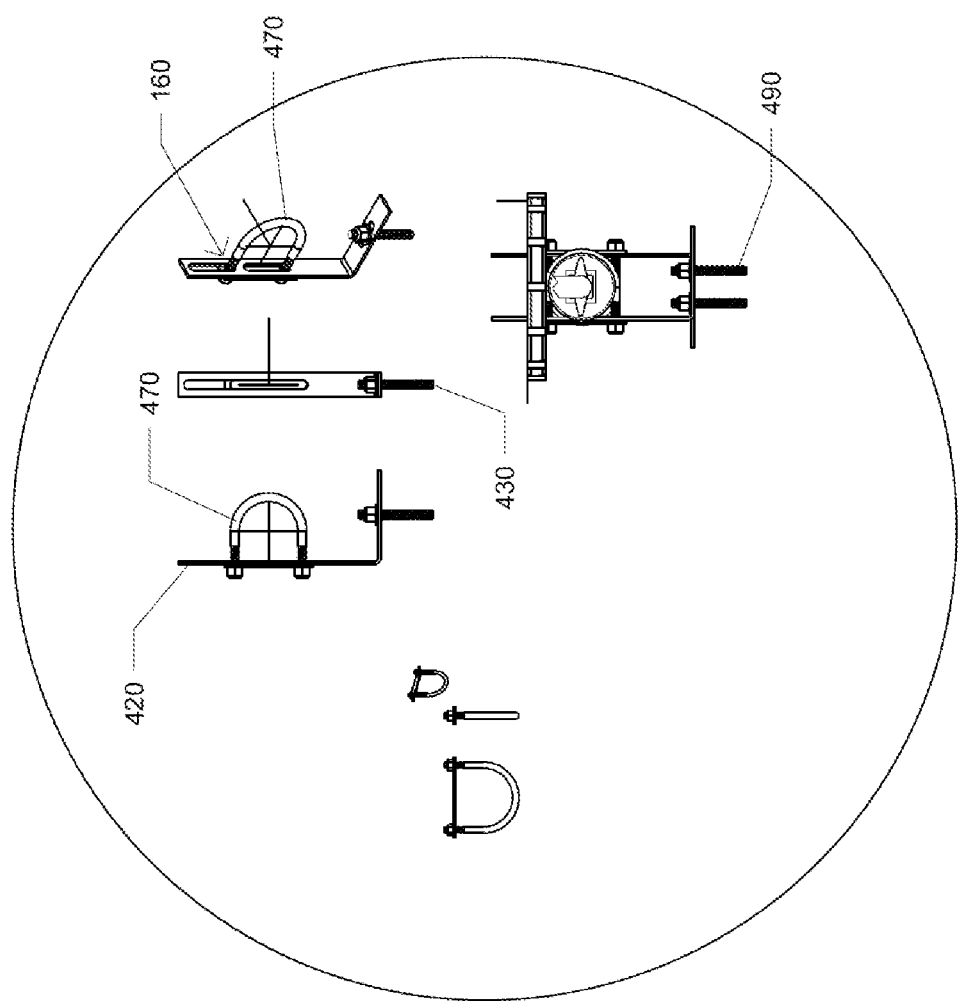

FIGS. 17A-17B shows a further possible configuration of a disc diffuser [?] module, which can be secured to the basin floor or wall. As shown in the detail of FIG. 17B, the manifold or pipe section 80 can be secured within the mounting clamp assembly 450, which includes a securing clamp 470, an L-shaped mounting bracket 480, and one or more bolts 490 for mounting to the floor of the basin. The mounting bracket 480 includes a lateral portion 160 for securing to a wall of the basin, if needed. The clamps and brackets shown, by way of example, may be made of stainless steel or plastic.

Figure 18:
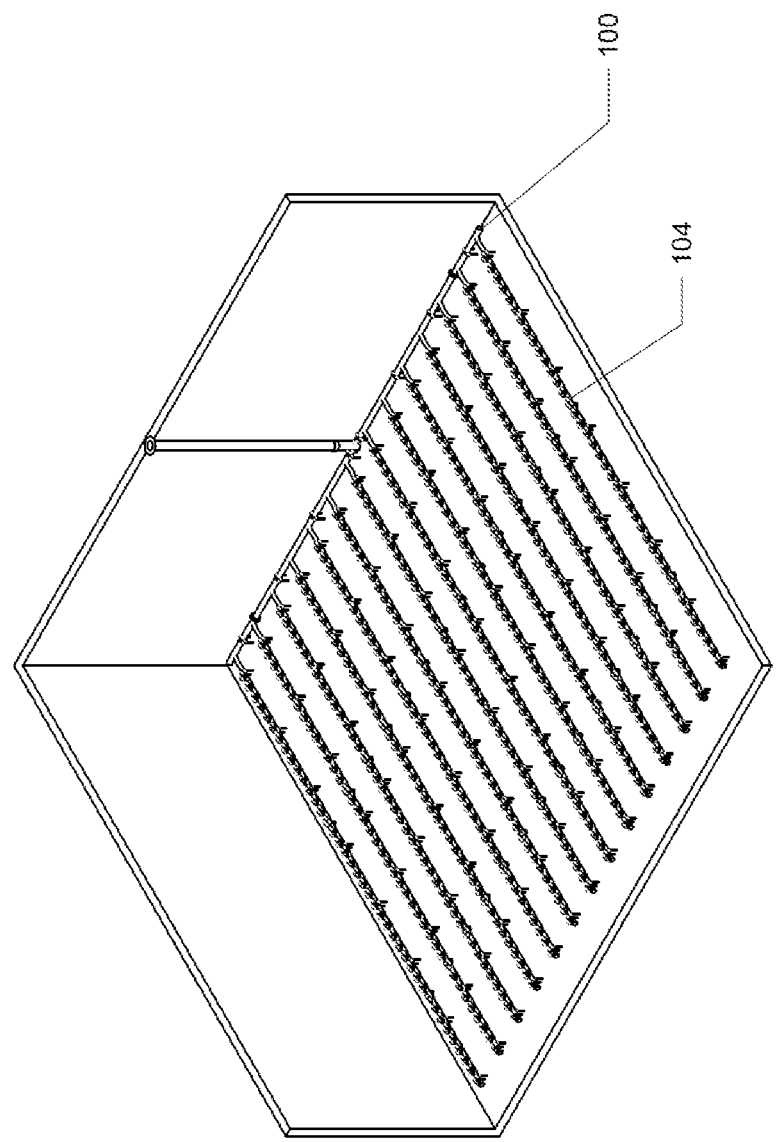
FIG. 18 shows one possible conventional configuration of an aeration system in a water tank and air supply pipes known in the art.

FIG. 18 shows a conventional disc diffuser aeration grid arrangement of disc diffuser modules 104 arranged in a grid. The modules 104 are connected to one another and to the main air supply manifold 106 via the coupling assembly 10 described above.

Figure 19:
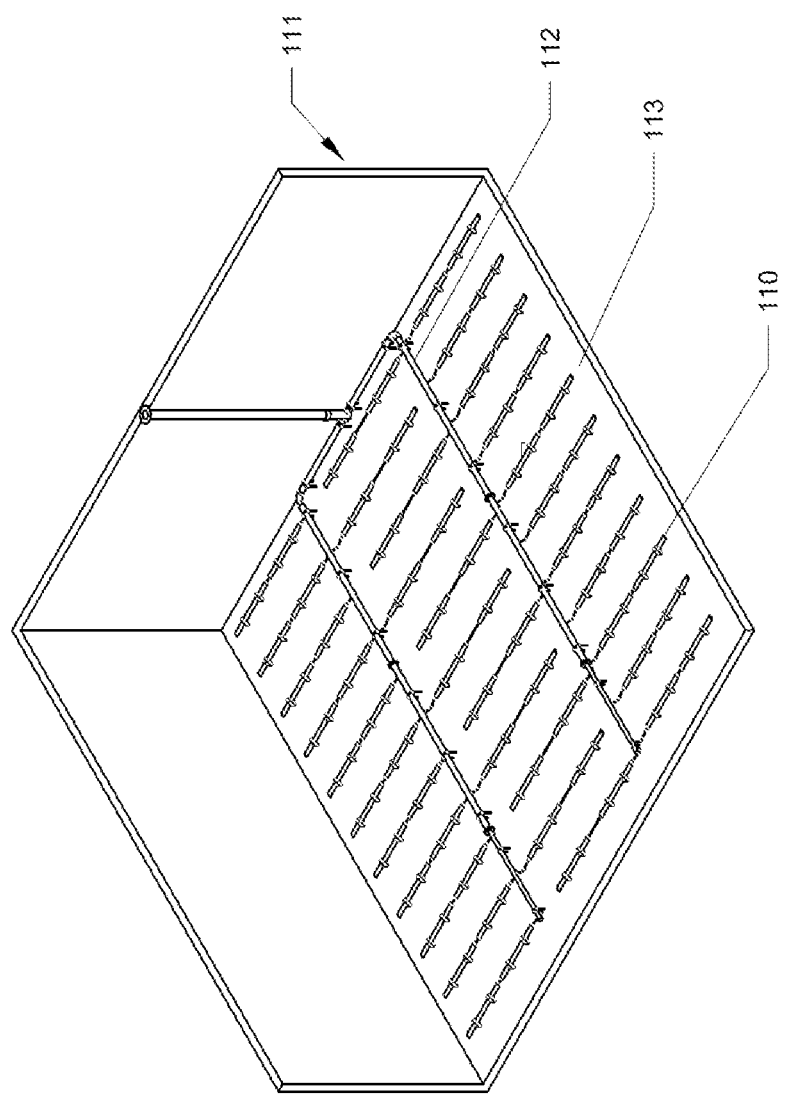
FIG. 19 shows a further configuration of an aeration system in a water tank utilizing the coupling assembly according to the present invention.

FIG. 19 shows a possible configurations of strip type diffusers 110 connected to the main air supply manifold 112 and/or to one another in series via the coupling assembly 10 described above. FIG. 17 shows an arrangement on the floor 113 of a water treatment tank 11.

Figure 20B:
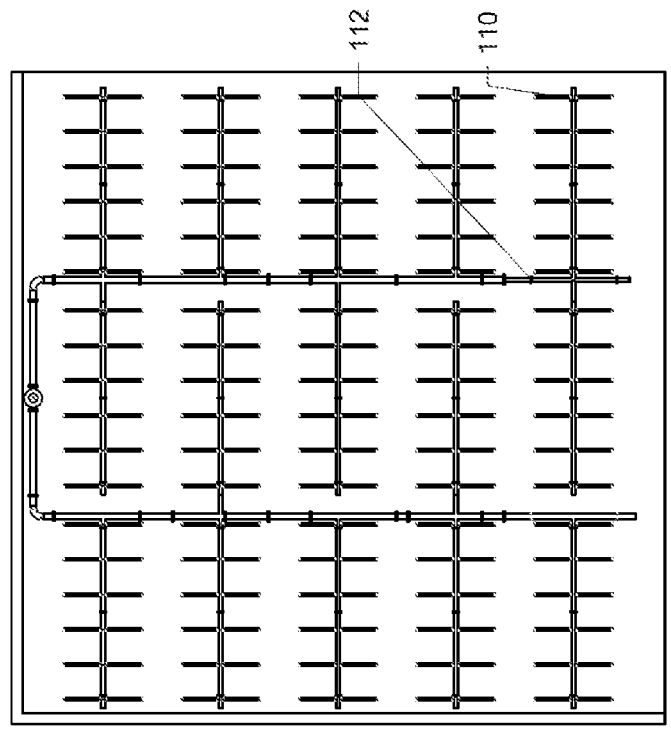
FIGS. 20A and 20B show a conventional tube diffuser arrangement and a conventional arrangement of tube diffusers and air supply pipes known in the art.
Figure 20A:
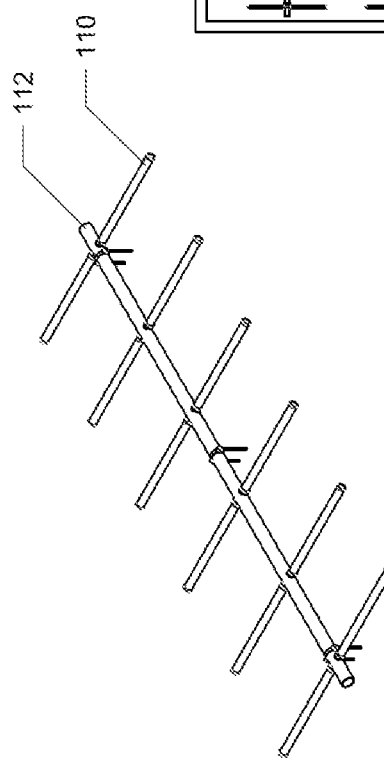

FIGS. 20A and 20B illustrate a conventional tube diffusers arrangement 120 fixed in a mounting bracket 122 at opposite ends, and the positioning of the tube diffusers 120 relative to the main air supply manifold 124.

Figure 21:
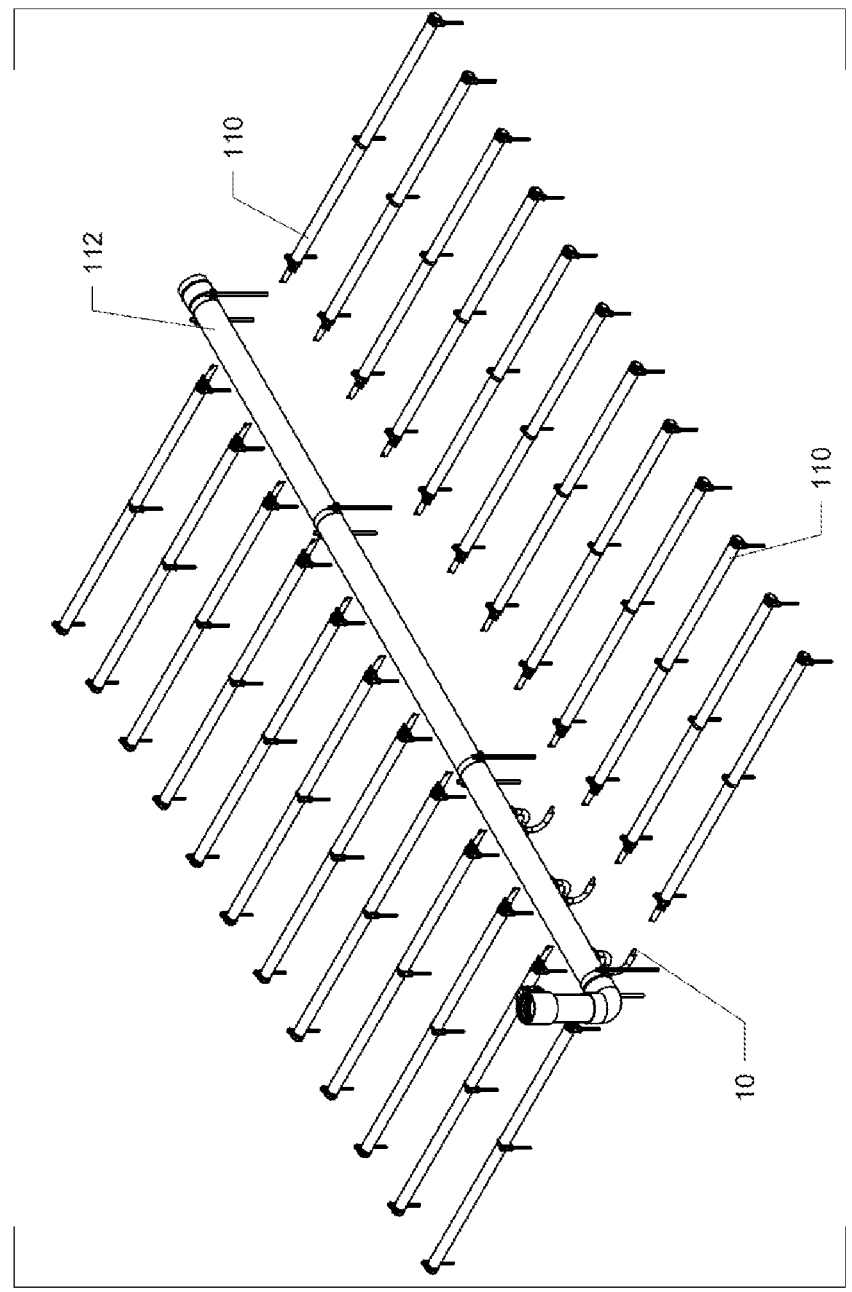
FIG. 21 shows a configuration of tube diffusers for connection to an air supply pipe using the coupling assembly according to the present invention.

FIG. 21 shows a configuration of tube diffusers for connection to a central air supply pipe via the coupling assembly according to the present invention.

Figure 22:
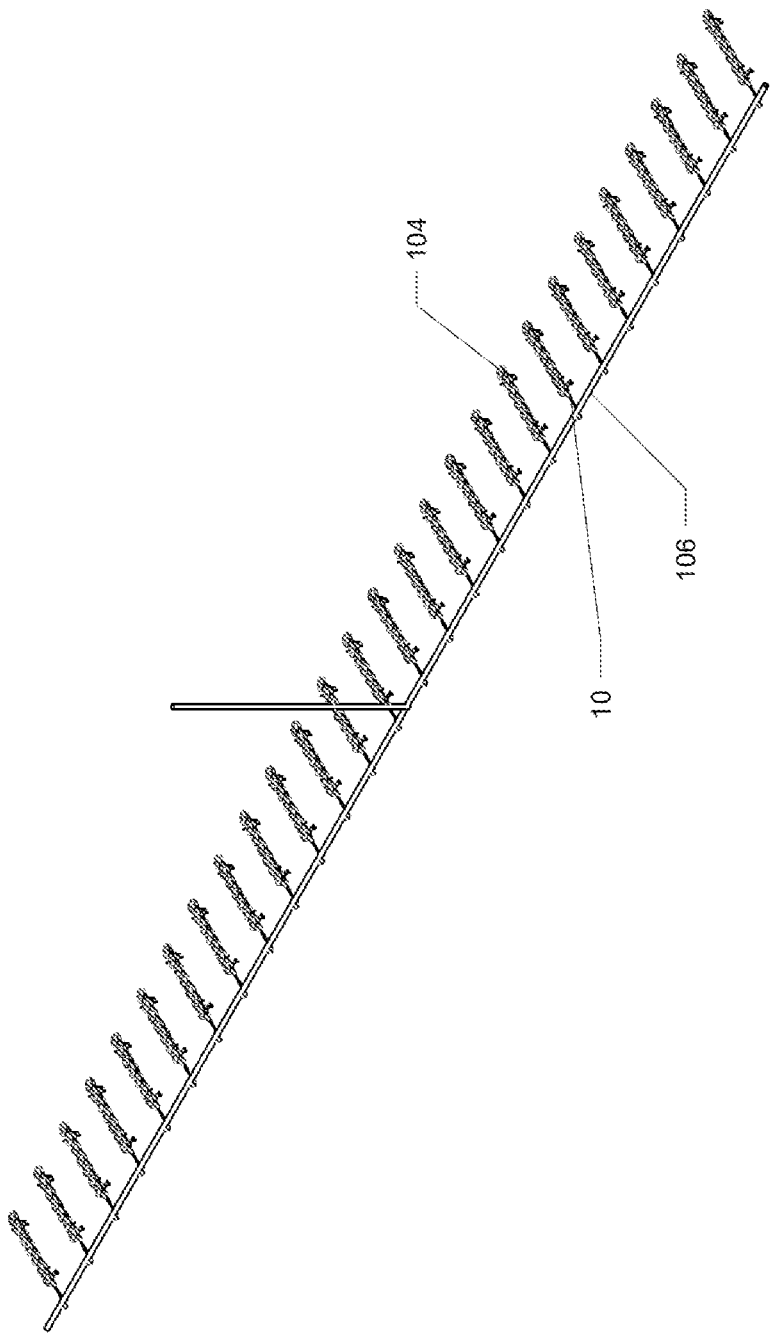
FIG. 22 shows a configuration of disc diffusers factory pre-installed onto modular pipe sections connected to an air supply pipe via the coupling assembly according to the present invention.

FIG. 22 shows a configuration of disc diffusers factory-pre-installed onto modular pipe sections connected to an air supply pipe via the coupling assembly according to the present invention.

FIG. 23A shows a tube diffuser and FIG. 23B shows a configuration of tube diffuser modular sections and directly anchored to the basin floor independent from the main air supply lateral pipe for connection to a central air supply pipe and in series to one another via the coupling assembly according to the present invention.

Figure 23C:
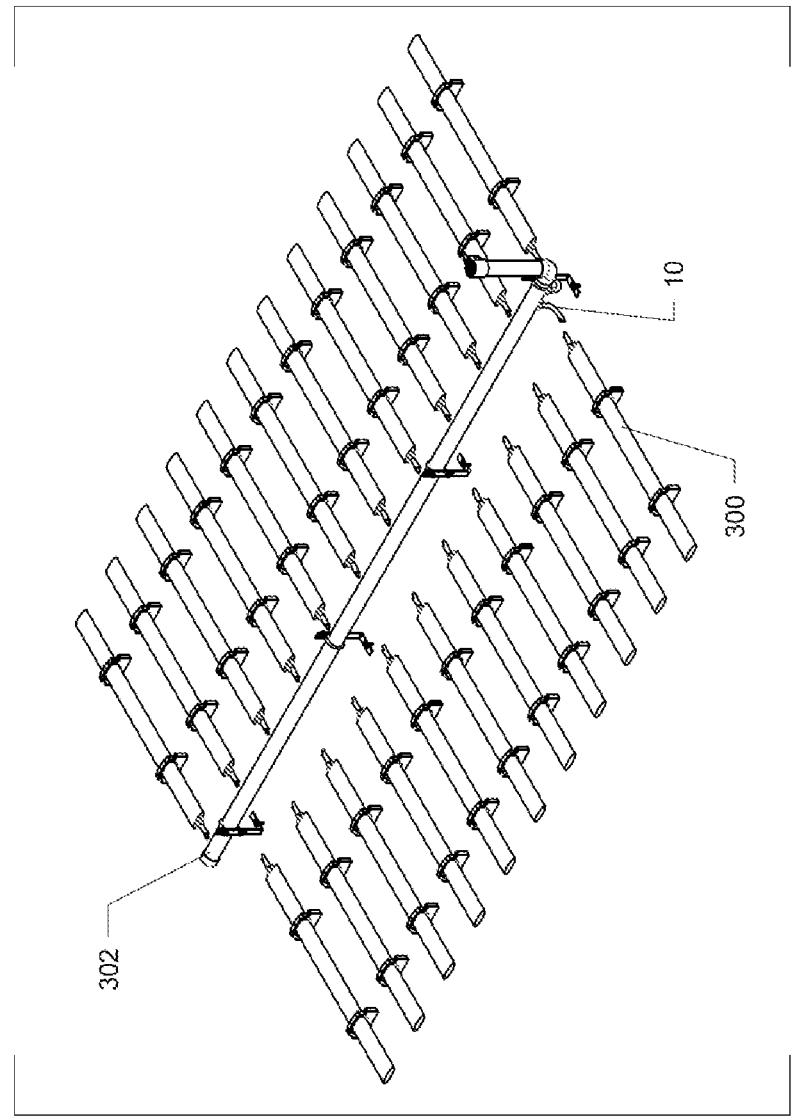
FIG. 23C shows a configuration of strip diffusers and directly anchored to the basin floor independent of the main air supply lateral pipe for connection to a central air supply pipe via the coupling assembly according to the present invention.

FIG. 23C shows a configuration of tube diffusers directly anchored to the basin floor independently from the main air supply lateral pipe, preferably at lower elevation than the main air lateral supply pipe for connection to a central air supply pipe via the coupling assembly according to the present invention. FIG. 23C shows a further possible configuration of strip diffusors 300 arranged for connection to the main air supply manifold or pipe 302.

Figure 24A:
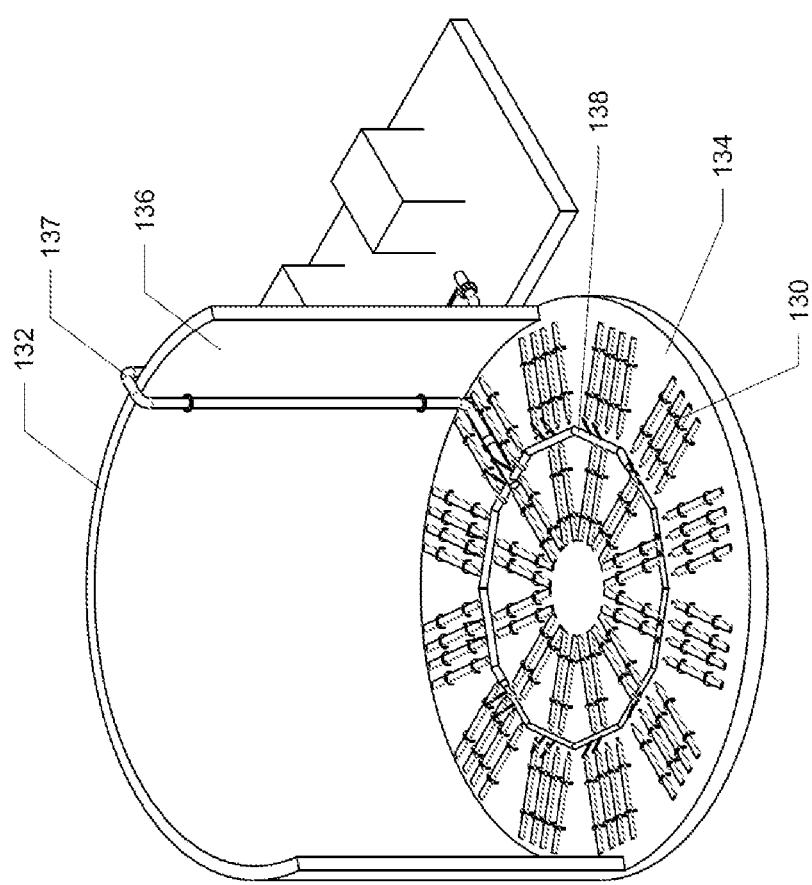
FIGS. 24A and 24B show a plan view and a top view, respectively, of a further configuration of strip diffusers in a water tank, utilizing the coupling assembly according to the present invention.
Figure 24B:
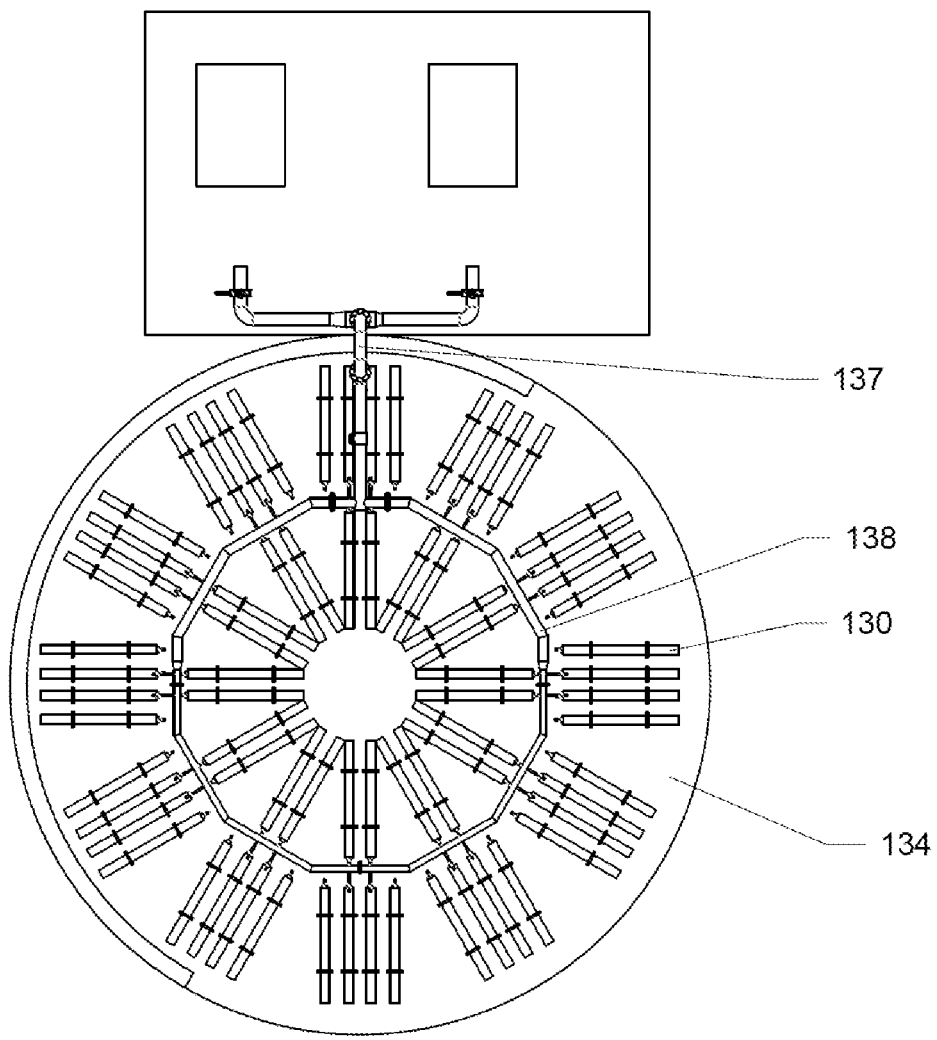

FIGS. 24A and 24B show a further possible configuration of strip diffusors 130 within a treatment tank 132. By way of example, FIG. 22A shows a circular/round tank 132 having a floor or bottom 134 to which the strip diffusors are mounted. The main air supply manifold 137 is positioned to run down a wall 136 of the tank and supplies a further air supply pipe 138 positioned on the tank floor 134. As shown, the strip diffusors 130 can be arranged to accommodate the circular floor 134 of the tank and are arranged here in concentric circles and are connected to the air supply pipe or manifold 138 via the coupling assembly 10 described above.

It is noted that while the figures show by way of example strip or tube type diffusors, the grid systems shown could utilize aeration elements of any type, including strip, disc, or tube diffusors.

Figure 25:
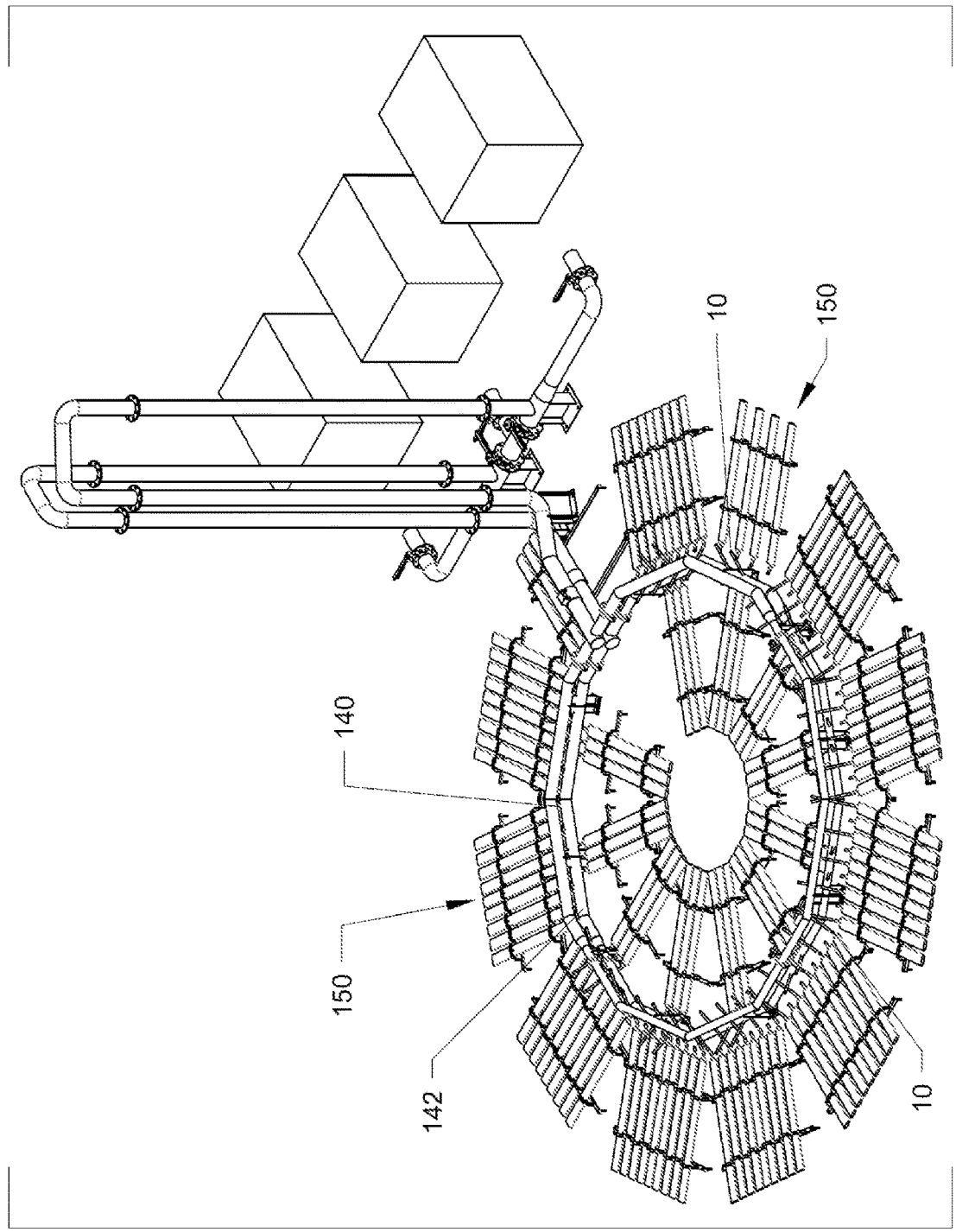
FIG. 25 shows a plan view of a further configuration of strip diffusers and connections to a dual air supply system using the coupling assembly according to the present invention.

FIG. 25 shows a further possible configuration utilizing the dual air control manifold assembly described above. In this example, two/dual air manifolds 140, 142 are provided in a stacked arrangement and the strip diffuser modules 150 are connected to the dual air control manifold assembly via the coupling assembly 10, flexible hose 18 described herein.

Figure 26:
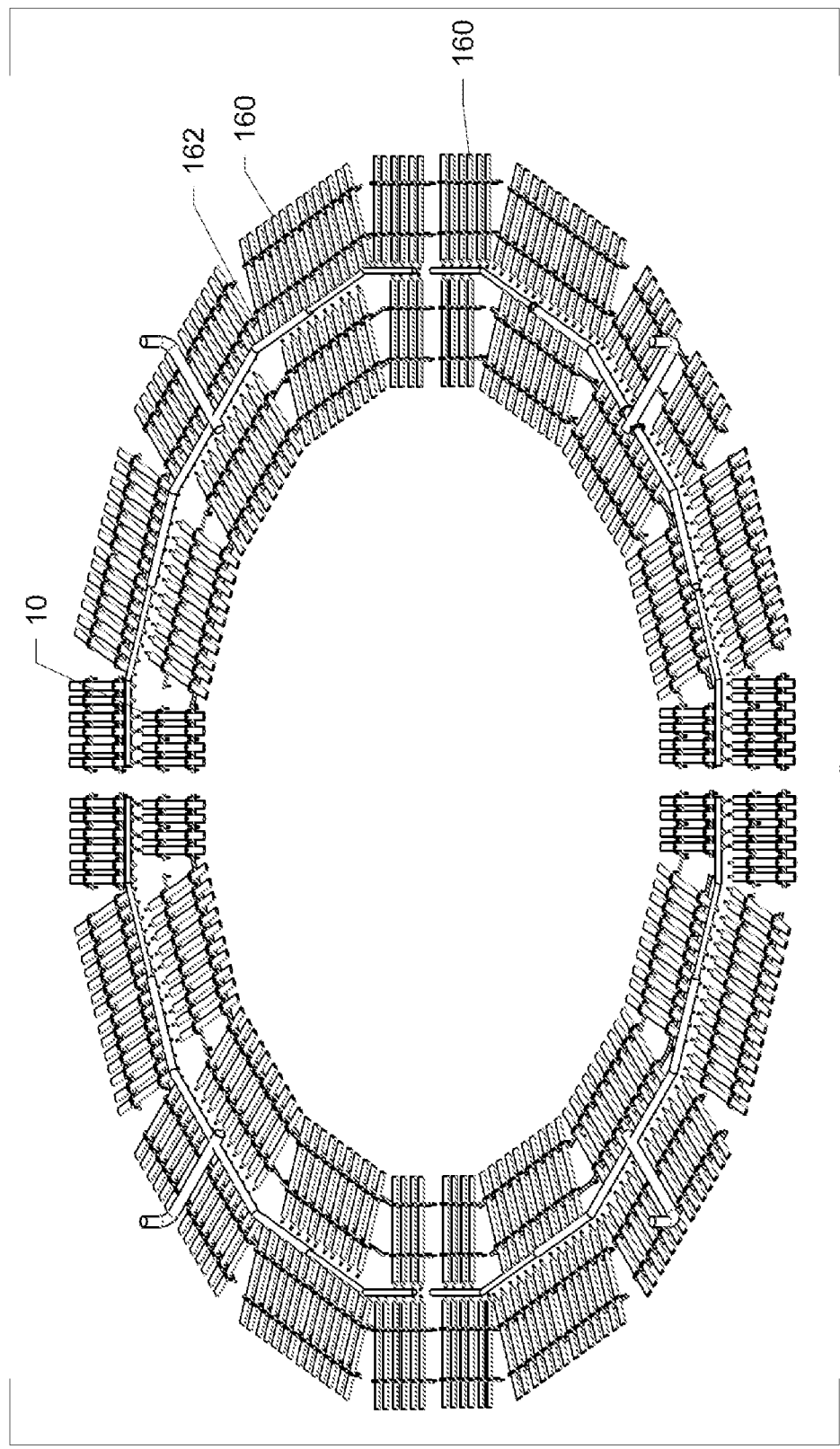
FIG. 26 shows a further configuration of strips diffusers in connection with an air supply line that can be arranged in the bottom of a water basin and which utilizes the coupling assembly according to the present invention.

FIG. 26 shows a further possible configuration of strip-type diffuser modules 160 arranged in a circular configuration, for example also on the floor of a tank or basin, connected to the main air supply pipe or manifold 162 via the coupling assembly 10 described herein.

Figure 27A:
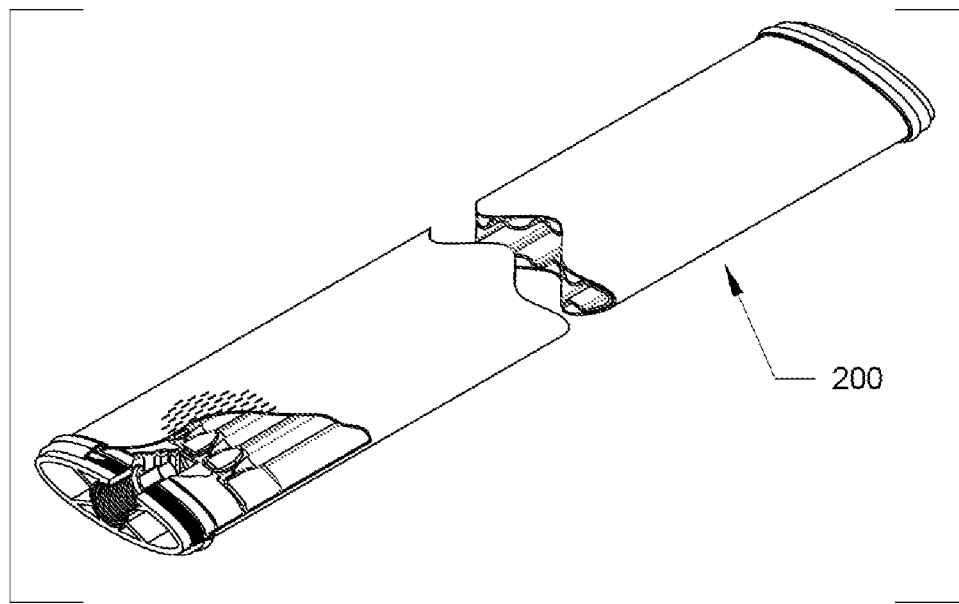
FIGS. 27A-27C show a strip diffuser with a cut-away view of the check valve and
flap (FIG. 25)
Figure 27B:
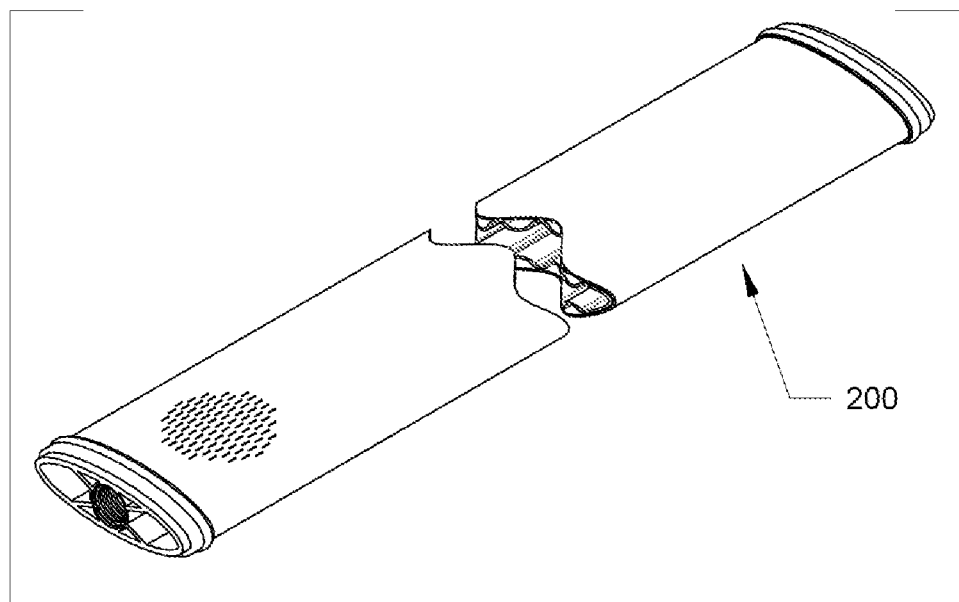
Figure 27C:
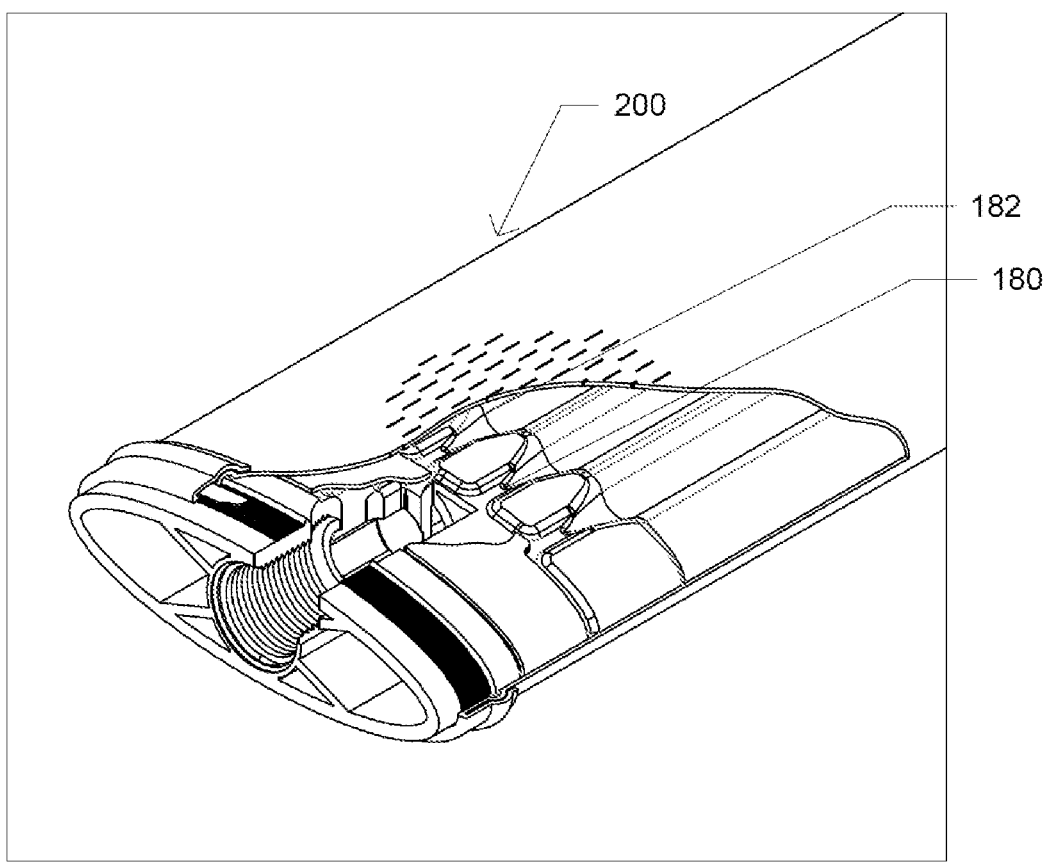
Figure 28A:
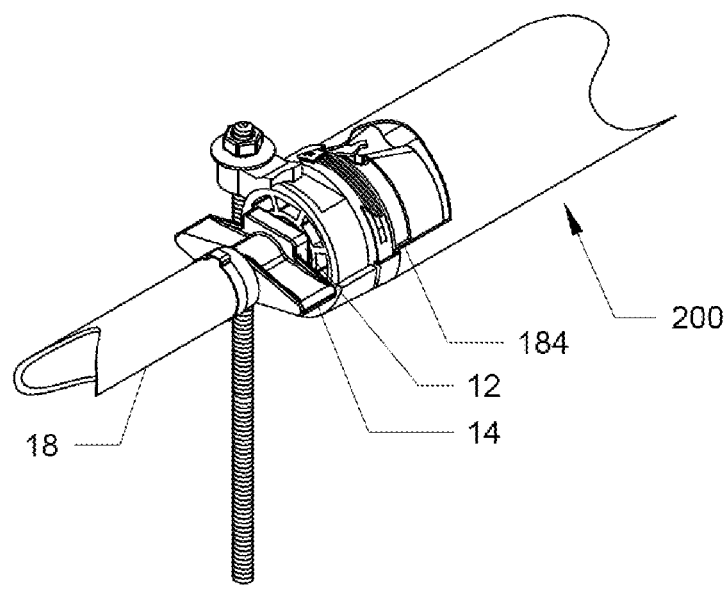
FIGS. 28A and 28B show a tube diffuser with the coupling assembly in place and showing the check valve.
Figure 28B:
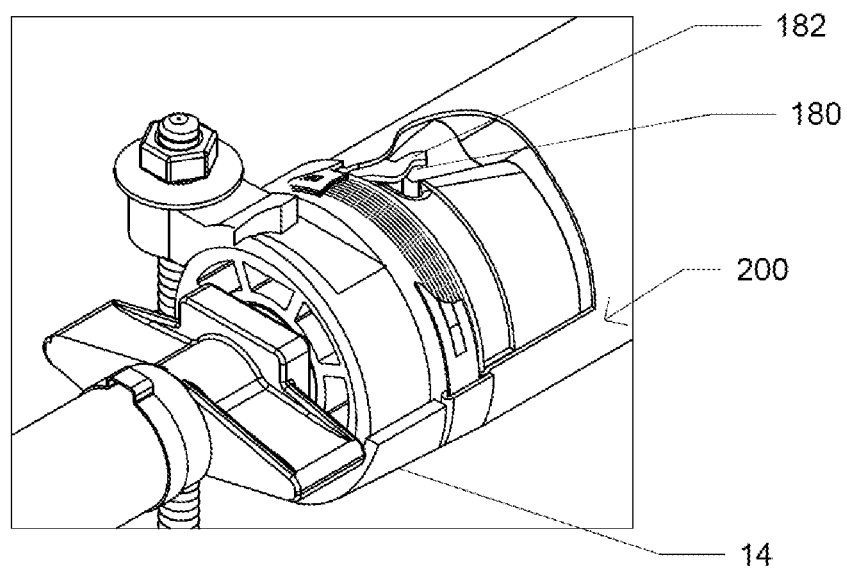
Figure 29:
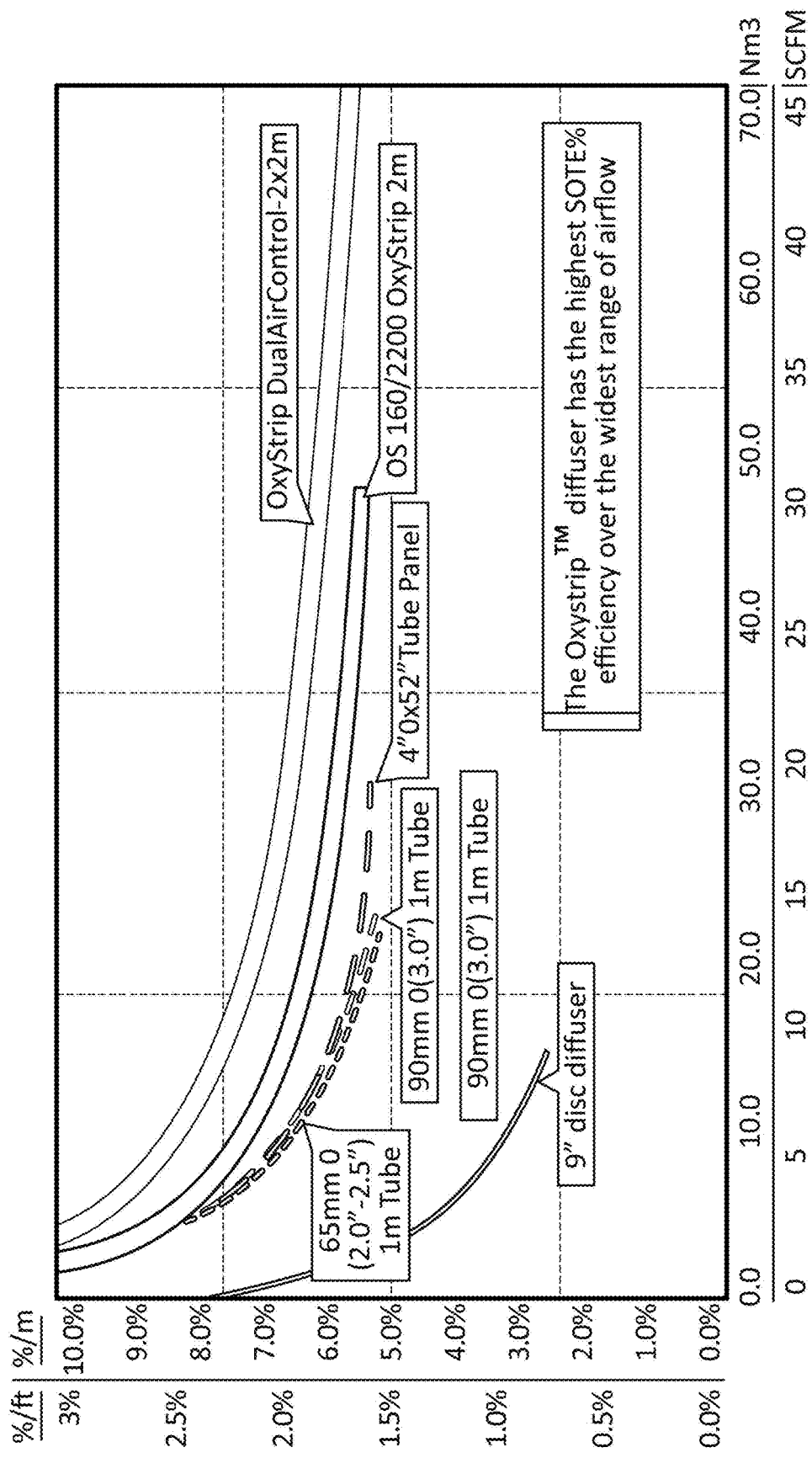
FIG. 29 is a graphical illustration of an equivalent number of diffuser components of 9" or 1 m 3" diameter tubular diffusers based on equal SOTE performance and design airflow overactive membrane, per tank & plan view layout.

FIGS. 27, 27A, 27B, 28A and 28B illustrate the different types of diffusors that may be utilized in the aeration grid system described herein. Specifically, FIG. 27, 27A, 27B, 28A show a strip-type diffusor, while FIGS. 28A and 28B show tube-type diffusors. Again, reference is made to U.S. Pat. No. 9,370,753, the contents of which are incorporated herein by reference in their entirety.

By way of example and with reference to the strip-type and tube-type diffusors shown in FIGS. 27A-C and FIGS. 28A and B, the diffuser includes a fixed orifice 180 for wide airflow range grid balancing. A flap 182 opens at greater airflow at increasing resistance of the elastomeric rubber band 184 covering the large capacity fixed orifice 180. Here, the strip diffuser has one or multiple large, fixed orifices supplying the diffuser membrane with air for fine bubble air release for a wide range of air capacity adjustment. The fixed orifice 180 is covered by circumferential elastomeric tight fit thin wall sleeve/rubber band or sleeve 184. The rubber sleeve 188 has cut out 190 forming a flap 182 over the fixed orifices. The rubber sleeve 184 expands and reveals the fixed orifice 180 for air proportional to the increasing airflow enabling diffuser grid air release balance over a wide range of airflow rates. The rubber sleeve 184, specifically, the flexible, elastomeric flap 182 forms a check valve by covering the fixed orifices 180 when the air is turned off and preventing sludge entering into the air distribution system in case a diffuser membrane is accidentally compromised or cut by floating debris, etc.

The present invention also contemplates a method to aerate water, for example, in a basin or tank or in a pond, using the aeration system and coupling assembly described above. The method includes providing a primary air supply pipe: providing at least one flexible hose; providing a first coupling assembly, comprising a mounting saddle, a hose barbed fitting, and a clamp; securing the clamp to the hose on the hose barb fitting; connecting the flexible hose to the primary air supply pipe at one end of the flexible hose one using the first coupling assembly; connecting one or more one diffusor sections to an opposite end of the flexible hose via a second coupling assembly; and providing a supply of air through the primary air supply pipe to the at least one or more diffuser sections.

I claim:
1. An aeration system for aerating a body of water in a concrete basin, comprising:
    a primary air supply line;
    at least one flexible hose;
    at least one coupling assembly, each assembly comprising:
        a hose barbed connector having a tapered, threaded male connection and a barbed male connection configured to be inserted on an end of the at least one flexible hose; and,
        a flexible grommet comprising a top surface with a central opening for receiving the tapered, threaded male connection; and,
    one or more diffuser sections connected to an opposite end of the at least one flexible hose via the at least one coupling assembly, the one or more diffuser sections forming an aeration grid, wherein the aeration grid is configured to be fixed to a concrete floor of the basin.
2. The aeration system according to claim 1, wherein for each assembly, the flexible grommet comprises a flexible elastomeric material.
3. The aeration system according to claim 2, wherein for each assembly, the flexible grommet further comprises a bottom concave surface for contacting an outer surface of the primary air supply line, and a threaded end configured to be inserted into a respective opening hole formed in the air supply line.
4. The aeration system according to claim 3, wherein a diameter of the threaded end of each assembly is larger than a diameter of the respective opening in the air supply line.
5. The aeration system according to claim 4, wherein the bottom surface of each assembly is configured, such that when the threaded end is inserted into the hole in the air supply pipe hole, the bottom surface is flush against an outer surface of the at least one further air supply line.
6. The aeration system according to claim 5, wherein the hose barbed connector includes first and second threaded ends and a central barbed or T-shaped section from which the first and second threaded ends extend.
7. The aeration system according to claim 4, wherein for each assembly, the flexible grommet forms a mechanical lock and airtight seal with the air supply line when the threaded end is inserted into the opening of the air supply line.
8. The aeration system according to claim 1, wherein each of the one or more diffuser sections is connected to at least one further diffuser section via the at least one flexible hose and the at least one coupling assembly.
9. The aeration system according to claim 1, wherein the primary air supply line is located at a higher elevation than an elevation of the one or more diffuser sections.
10. The aeration system according to claim 1, wherein the one or more diffuser sections each comprise a plurality of disc diffusers mounted on at least one further air supply line.
11. The aeration system according to claim 1, wherein the one or more diffuser sections comprise at least one tube or strip diffuser.
12. The aeration system according to claim 1, wherein one or more of the one or more diffuser sections are connected by the at least one flexible hose and the at least one coupling assembly in series to one another.
13. The aeration system according to claim 1, further comprising at least one bracket assembly configured to secure the at least one or more diffuser sections to the concrete floor of the basin.
14. The aeration system according to claim 1, wherein the one or more diffuser sections comprise a plurality of strip or tube diffusers without a rigid connection to the primary air supply line.
15. The aeration system according to claim 1, wherein the one or more diffuser sections comprise one or more strip or tube diffusers, wherein each of the strip or tube diffusers comprises:
    at least one fixed orifice to supply a membrane of the one or more diffusers with air for fine bubble air release;
    at least one elastomeric sleeve circumferentially covering a respective one of the at least one fixed orifice; and
    at least one flap formed out of a respective one of the at least one elastomeric sleeve, wherein the at least one elastomeric sleeve is configured to expand and thereby reveal the at least one fixed orifice to accommodate air flow proportion with an increasing airflow, thereby enabling diffuser grid air release balance over a selected range of airflow rates, wherein the at least one elastomer sleeve and the at least one flap form at least one check valve.
16. The aeration system according to claim 1, further comprising, for each assembly, a clamp configured to secure the connection of the hose barbed connector to the at least one flexible hose.
17. A coupling assembly to connect components of a water aeration grid, comprising:
    a hose barbed connector having a tapered, threaded male connection and a barbed male connection configured to be inserted into an end of at least one flexible hose comprised by the aeration grid;
    a flexible grommet comprising a top surface with a central opening for receiving the tapered, threaded male connection; and
    a clamp configured to secure the at least one flexible hose to the hose barbed connector, the coupling assembly being configured to connect the at least one flexible hose to a primary air supply line at one end of each of the at least one flexible hose.
18. The coupling assembly according to claim 17, wherein the flexible grommet comprises a flexible elastomeric material.
19. The coupling assembly according to claim 18, wherein the flexible grommet further comprises a bottom concave surface for contacting an outer surface of the primary air supply line, and a threaded end for insertion into a hole formed in the primary air supply line.

20. The coupling assembly according to claim 19, wherein a diameter of the threaded end is larger than a diameter of the hole in the air supply line.

21. The coupling assembly according to claim 19, wherein the bottom surface is configured, such that when the threaded end is inserted into the hole in the air supply pipe hole, the bottom surface is flush against the outer surface of the air supply line.

22. The coupling assembly according to claim 19, wherein the hose barbed connector includes first and second threaded ends and a central barbed or T-shaped section from which the first and second threaded end portions extend.

23. The coupling assembly according to claim 19, wherein the coupling assembly is configured to connect at least one diffuser section to at least one further diffuser section in series to form the water aeration grid.

24. The coupling assembly according to claim 23, wherein the series of connected diffuser sections are located at an elevation that is lower that an elevation of the primary air supply line.

25. The coupling assembly according to claim 23, wherein the at least one diffuser section comprises one or more tube or strip diffusers.

26. The coupling assembly according to claim 19, further comprising a mounting saddle configured to mount at least one disc diffuser onto at least one further air supply line.

27. A method for aerating water, comprising:
providing a primary air supply line:
providing at least one flexible hose;
providing at least one coupling assembly, each assembly comprising:
  a hose barbed connector having a tapered, threaded male connection and a barbed male connection configured to be inserted an end of the at least one flexible hose, and
  a flexible grommet comprising a top surface with a central opening for receiving the tapered, threaded male connection;
securing the clamp to the at least one flexible hose on the hose barb fitting;
connecting the at least one flexible hose to the primary air supply line at one end of the at least one flexible hose one using the first at least one coupling assembly;
connecting one or more diffuser sections to an opposite end of the flexible hose via the at least one coupling assembly; and
providing a supply of air through the primary air supply line to the one or more diffuser sections.

28. The method according to claim 27, wherein for each assembly, the flexible grommet comprises a flexible elastomeric material.

29. The method according to claim 28, wherein for each assembly, the hose barbed connector includes first and second threaded ends and a central barbed or T-shaped section from which the first and second threaded ends extend.

30. The method according to claim 27, wherein for each assembly, the flexible grommet further comprises a bottom concave surface for contacting an outer surface of the primary air supply line, and a threaded end for insertion into a respective opening formed in the air supply line pipe.

31. The method according to claim 30, wherein a diameter of the threaded end of each assembly is larger than the respective opening in the air supply line.

32. The method according to claim 30, further comprising inserting the threaded end of each assembly into the respective opening in the air supply line, so that the bottom surface is flush against the outer surface of the air supply line.

33. The method according to claim 27, further comprising connecting each of the at least one diffuser sections to at least one further diffuser section via the at least one flexible hose and the at least one coupling assembly.

34. The method according to claim 27, further comprising locating the primary air supply line at a higher elevation than an elevation of the one or more diffuser sections.

35. The method according to claim 34, wherein the one or more diffuser sections comprise a plurality of disc diffusers mounted onto at least one further air supply line.

36. The method according to claim 27, wherein the one or more diffuser sections comprise one or more tube or strip diffusers.

37. The method according to claim 27, wherein the one or more diffuser sections are connected by the at least one flexible hose and the at least one coupling assembly in series to one another.

* * * * *